United States Patent
Cronie

(10) Patent No.: US 9,160,406 B2
(45) Date of Patent: Oct. 13, 2015

(54) METHODS AND SYSTEMS FOR EFFICIENT MULTI-WIRE COMMUNICATIONS AND CROSSTALK CANCELLATION

(71) Applicant: Harm Cronie, Poliez-le-Grand (CH)

(72) Inventor: Harm Cronie, Poliez-le-Grand (CH)

( * ) Notice: Subject to any disclaimer, the term of this patent is extended or adjusted under 35 U.S.C. 154(b) by 0 days.

(21) Appl. No.: 14/244,438

(22) Filed: Apr. 3, 2014

(65) Prior Publication Data

US 2014/0355407 A1 Dec. 4, 2014

Related U.S. Application Data

(60) Provisional application No. 61/829,384, filed on May 31, 2013.

(51) Int. Cl.
*H04B 3/32* (2006.01)

(52) U.S. Cl.
CPC ........................................ *H04B 3/32* (2013.01)

(58) Field of Classification Search
CPC ........................................................ H04L 5/12
See application file for complete search history.

(56) References Cited

U.S. PATENT DOCUMENTS

| | | | |
|---|---|---|---|
| 5,887,032 A | 3/1999 | Cioffi | |
| 6,985,534 B1 * | 1/2006 | Meister | 375/260 |
| 7,190,665 B2 * | 3/2007 | Warke et al. | 370/201 |
| 7,349,480 B2 | 3/2008 | Tsatsanis et al. | |
| 7,570,685 B2 | 8/2009 | Takatori et al. | |
| 7,769,100 B2 | 8/2010 | Cheong et al. | |
| 8,442,152 B2 | 5/2013 | Raleigh et al. | |
| 2006/0056522 A1 * | 3/2006 | Tsatsanis et al. | 375/257 |
| 2010/0183141 A1 | 7/2010 | Arai et al. | |
| 2011/0002463 A1 * | 1/2011 | Michaels et al. | 380/268 |
| 2011/0268225 A1 * | 11/2011 | Cronie et al. | 375/296 |
| 2011/0302478 A1 * | 12/2011 | Cronie et al. | 714/777 |

* cited by examiner

*Primary Examiner* — Sulaiman Nooristany
(74) *Attorney, Agent, or Firm* — Oliff PLC; R. Brian Drozd

(57) ABSTRACT

Methods and systems are disclosed for efficient cancellation of crosstalk between signals transmitted over multiple signal paths. Symmetry is induced on the signals transmitted over the signal paths such that the crosstalk matrix becomes a matrix with structure. Such structured matrix may be a circulant matrix of which the inverse may be applied efficiently to transmitted symbols or received symbols. Application of such inverse may comprise the fast Fourier transform. Applications of the methods and systems disclosed include chip-to-chip communications, on-chip communications, communication over cables and storage of information.

12 Claims, 20 Drawing Sheets

METHODS AND SYSTEMS FOR EFFICIENT MULTI-WIRE COMMUNICATIONS AND CROSSTALK CANCELLATION

CROSS REFERENCES TO RELATED APPLICATIONS

This application claims the benefit of U.S. Provisional Application No. 61/829,384, filed May 31, 2013, titled "Methods and Systems for Efficient Multi-conductor Communications and Crosstalk Cancellation", the contents of which are hereby incorporated in its entirety by reference.

FIELD OF INVENTION

Some embodiments relate to communications in general and in particular to transmission of signals capable of conveying information, wherein communication takes place over channels that comprise multiple physical propagation paths.

BACKGROUND OF THE INVENTION

The goal of communication systems is to convey information reliably from one physical location to another. Often information transmission needs to be performed at high speeds and power consumption needs to be low.

One communication scenario where this is the case is chip-to-chip communications where semiconductor components communicate with each other. Examples of such components are processors, memories and application specific integrated circuits (ASICs).

Communication is not perfect and some sources of imperfections are noise and non-idealities of the components making up the communication system.

The path between the source and destination of the information may be modelled by a communication channel or channel. The channel may include the effect of the main propagation medium, connectors and other circuit components or integrated circuits (ICs). As an example, the channel in digital subscriber line communications (DSL) may include a twisted pair of copper conductors and a connector that connects the twisted pair to the DSL modem. Furthermore, the channel may include the non-ideal characteristics of the DSL receiver front-end.

The channel may comprise one or multiple signal paths. The signal path is able to carry a physical quantity in the form of a signal. The information to be conveyed is represented by symbols that may be generated by a source. A symbol may be modulated into a signal that may be transmitted over the signal path. At the destination the signals on the signal paths are read and/or measured and a received symbol is extracted from which the original information may be recovered.

A signal path may be an electrical conductor, an electrical waveguide, an optical waveguide, etc. The signal path may include additional electrical and/or optical components and ICs.

In many scenarios communication takes place over a set of parallel signal paths that comprise electrical conductors. The theory of this setting of parallel electrical conductors is known to those of skill in the art and may be described by the theory of multi-conductor transmission lines (MCTL).

An example of an application where parallel signal paths that comprise conductors are used is server backplane communications. Many signal paths or pairs of signal paths are packed on a printed circuit board (PCB) to facilitate communications between e.g. CPU and memory. Another example is the use of silicon interposers or through silicon vias (TSVs) used to connect two or more semiconductor components.

One major issue with communication over parallel signal paths is that the signal paths interact with each other. In a communication setting where different signals are to be transmitted over each of the signal paths this leads to crosstalk between the transmitted and/or received signals.

Crosstalk often limits the capabilities of a communication system. For instance, crosstalk may limit the amount of information that can be transmitted reliably. Moreover, it may also limit the maximum rate at which information can be transmitted since crosstalk often becomes worse at higher transmission rates.

In many communication systems where multiple signal paths are present, the spacing between the signal paths must be large enough such that crosstalk is below an acceptable level. This limits the allowable density of the signal paths and the total bandwidth that can be obtained.

The disadvantage of many prior art approaches to mitigate crosstalk is that crosstalk is not cancelled completely. Moreover, the approaches to mitigate crosstalk by signal processing techniques lead to high implementation and hardware complexity. This is especially the case when the number of signal paths increases since for such signal processing methods complexity usually grows quadratically with the number of signal paths. This results in increased silicon footprint and power consumption, which makes these prior art approaches of limited use in e.g. high-speed chip-to-chip communications.

There is currently no system able to mitigate and/or cancel crosstalk between multiple signal paths completely and is efficient in terms of implementation and hardware complexity. Embodiments of the invention are directed toward solving these and other problems individually and/or collectively.

BRIEF SUMMARY OF THE INVENTION

The present disclosure provides methods and systems able to mitigate and/or cancel crosstalk between multiple signal paths completely and are efficient in terms of implementation and hardware complexity. In accordance with aspects of the invention, symmetry is present between the signals conveyed on the signal paths such that the crosstalk, which may be described by a crosstalk matrix, has structure. Such structure allows the crosstalk between the signals conveyed on the signal paths to be mitigated in an efficient manner.

In accordance with a particular embodiment of the invention, the symmetry between the signals leads to a crosstalk matrix that is circulant. Such symmetry may be created by extending the main signal paths by additional signal paths. The signals conveyed on these additional signal paths may be generated as a function of the signals conveyed on the main signal paths. A transmitter and/or receiver may mitigate the effect of crosstalk between the signals on the main signal paths. Such mitigation may be performed very efficiently due to the symmetry that is present between the signals that are conveyed on the main signal paths.

In accordance with a particular embodiment of the invention the symmetry between the signals leads to a crosstalk matrix that is circulant. Such symmetry may be obtained by providing the signal paths in a twisted configuration. A transmitter and/or receiver may mitigate the effect of crosstalk. Such mitigation may be performed very efficiently due to the circulant crosstalk matrix.

In accordance with a particular embodiment of the invention the crosstalk is mitigated by the application of the inverse of the circulant crosstalk matrix to the symbols representing information. In a particular embodiment such application may be performed with fast algorithms based on the discrete Fourier transform.

In accordance with a particular embodiment of the invention the crosstalk is mitigated by the application of the inverse of the circulant crosstalk matrix to the received symbols corresponding to the received signals on the signal paths. In a particular embodiment such application may be performed with fast algorithms based on the discrete Fourier transform.

In one aspect, provided is a method of transmitting symbols representing information on a plurality of signal paths where the crosstalk between the symbols is described by a crosstalk matrix. The method may include: receiving a first set of symbols representing the information; forming a second set of symbols based at least in part on the first set of symbols; forming a first set of signals based at least in part on the first set of symbols and the second set of symbols; and providing the first set of signals for transmission over the signal paths such that the crosstalk matrix is circulant.

In another aspect, provided is a method of transmitting symbols representing information on a plurality of signal paths where the crosstalk between the symbols is described by a circulant crosstalk matrix. The method may include receiving a first set of symbols representing the information; forming a second set of symbols based at least in part on the first set of symbols and the inverse of the circulant sampled crosstalk matrix; forming a first set of signals based at least in part on the second set of symbols; and providing the first set of signals for transmission over the signal paths.

In another aspect, a method is provided for receiving symbols representing information from a plurality of signal paths where the crosstalk between the symbols is described by a circulant crosstalk matrix. The method may include receiving a first set of symbols from the signal paths and forming a second set of symbols based at least in part on the first set of symbols and the inverse of the circulant sampled crosstalk matrix.

In another aspect, an apparatus capable of conveying symbols representing information where the crosstalk between the symbols is described by a crosstalk matrix. The apparatus may include a plurality of signal paths arranged in such a way that the crosstalk matrix is circulant; and a receiver configured to receive a first set of symbols; and form a second set of symbols based at least in part on the first set of symbols and the inverse of the circulant sampled crosstalk matrix.

This Brief Summary of the Invention is provided to introduce a selection of concepts in a simplified form that are further described below in the Detailed Description of the Invention. This Brief Summary of the Invention is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description of the Invention and the included figures.

DETAILED DESCRIPTION OF THE INVENTION

The goal of communication systems is to convey information reliably from one physical location to another. The path between the source of the information and the destination of the information may be modelled by a communication channel or channel. The channel may include the effect of the main propagation medium, connectors and other circuit components or integrated circuits The input to the channel is a physical waveform or signal that may represent a physical quantity. Some examples of such physical quantities are voltages, currents and intensities. Other examples are known to those of skill in the art.

Once transmitted, the signal traverses the elements making up the channel. In many cases the spatial extent of the signal is somewhat confined which allows one to identify a propagation path. Such confinement is often the result of interfaces between different materials. The propagation path of the signal is referred to as the signal path.

Examples of signal paths and/or parts of signal paths are an electrical conductor of a transmission line, an electrical waveguide that may be used to guide electromagnetic radiation and an optical waveguide or optical fibre.

The signal path may comprise other elements encountered in between the source and destination. For instance in the setting of chip-to-chip communications examples of such elements are transmission lines, bond wires, through silicon vias (TSVs), coupling capacitors and additional electronic components such as amplifiers.

In some cases a signal path comprises a pair of physical wires or propagation paths. For instance in chip-to-chip communication differential signalling is often used and a signal path may comprise a differential pair of wires. In such case the physical quantity represented by the signal may be the difference between two physical quantities such as voltages and/or currents.

The information transmitted by the transmitter of the communication system is encoded and/or modulated into some properties of the signal. Examples of basic modulation methods are amplitude modulation and frequency modulation. An example of a more advanced modulation method is orthogonal frequency division multiplexing (OFDM). Many other modulation methods are known to those of ordinary skill in the art A channel may comprise multiple signal paths on which signals carrying information may propagate. Such a setting is now further described with reference to FIG. 1.

Figure 1:
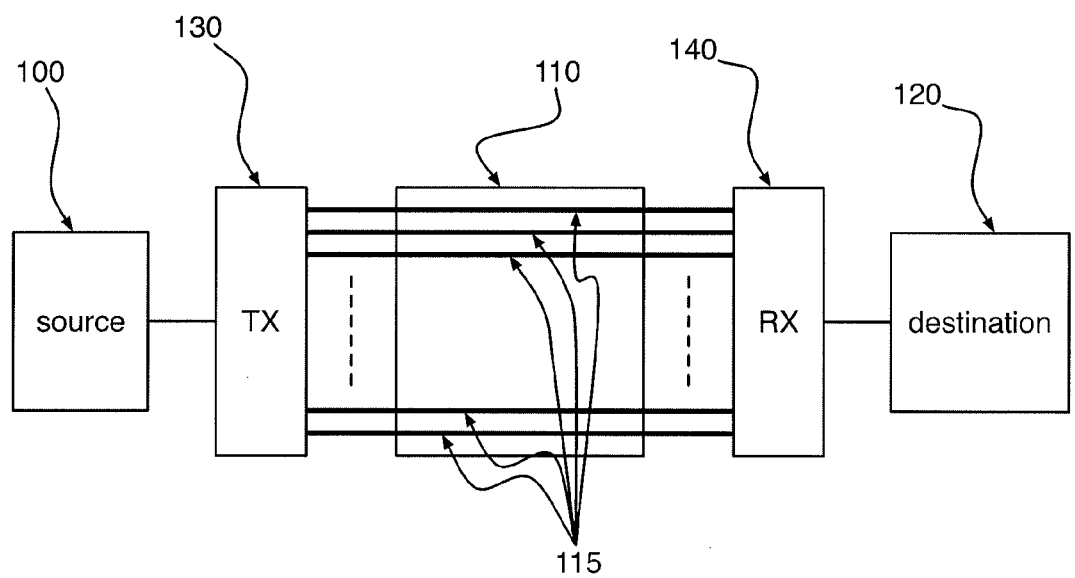
FIG. 1 is a schematic diagram depicting aspects of an example communication system in accordance with at least one embodiment of the invention.

FIG. 1 exemplifies a communication system where information available in source 100 is transmitted to a destination 120. The channel 110 comprises n signal paths 115. For the purpose of the teachings in this disclosure, the number of signal paths n is an integer larger than three. The number of signal paths n may be equal to e.g. 4, 5, 8, 12, 16, 32, 100, etc.

A transmitter 130 generates n signals for transmission over signal paths 115 based on the information in 100. A receiver 140 receives the signals present on the signal paths 115. Based on these signals the information transmitted is recovered.

New information may periodically become available in the source 100. For instance every T seconds new information may become available. Such information may originate from an external source. The information may be available as binary digits (bits) or as other representations known to those of skill in the art.

To further set the context for the teachings of this application, a general high-level model of the communication system is described next. Without loss of generality it is assumed that the effect of the channel on the information transmitted over the signal paths 110 may be described in discrete-time by the equation y=Hx, where H is a n×n matrix. Furthermore, x and y are vectors of size n. The ith component of x and y are denoted by $x_i$ and $y_i$, respectively. In some embodiments the entries of H, x, y are real numbers. Other options may be possible and the entries may be for instance complex numbers.

The vector x is a representation of the information in source 100 that may be generated by transmitter 130. The key element that makes x a representation of the information in source 100 is that the relation between x and the information is such that the information may be recovered from x without loss.

The ith component of x may be transmitted over the ith signal path of the signal paths 115. The vector y may represent an estimate of the information transmitted as made by the receiver 140. The ith component of y may be received from the ith signal path of signal paths 115.

The matrix H summarizes the effect of the channel 110 and its signal paths 115. The matrix H is called the sampled crosstalk matrix. In an ideal communication system the matrix H is a diagonal matrix. In present teachings crosstalk is present and by definition the sampled crosstalk matrix is not a diagonal matrix. The off diagonal elements cause crosstalk between the components of x.

One may compensate for the crosstalk caused by the sampled crosstalk matrix H. Methods may be used that are related to multiple-input multiple-output (MIMO) systems. Such methods may for instance apply the inverse of H to either x or y at the transmitter and/or receiver, respectively. However, the major downside is that the application of such inverse has complexity $O(n^2)$. For many applications this leads to prohibitively high hardware complexity. The teachings of this application provide for embodiments that allow for much lower complexity.

A First Embodiment

Figure 2:
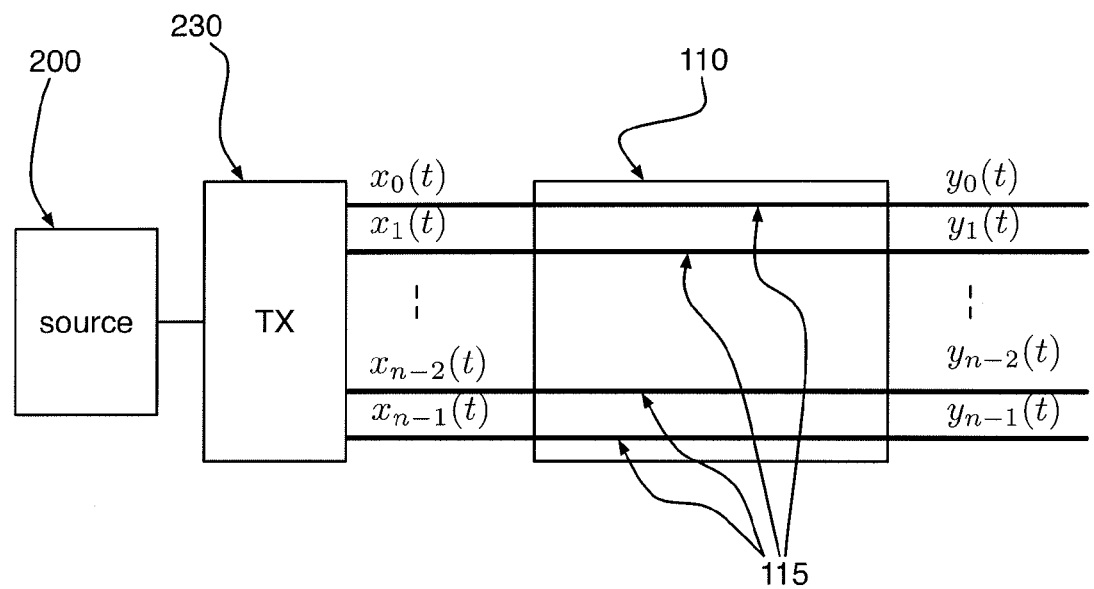
FIG. 2 is a schematic diagram depicting aspects of a transmitter operating over a plurality of signal paths in accordance with at least one embodiment of the invention.

A first embodiment is now further described with reference to FIG. 2. FIG. 2 shows a transmitter 230 that operates on channel 110 comprising n signal paths 115. The signals generated by transmitter 230 for each of the signal paths 115 are denoted by $x_0(t), \ldots, x_{n-1}(t)$. Here it is understood that signal $x_i(t)$ is transmitted on the ith signal path where the index i runs from 0 to n−1. At the location along the signal paths 115 where each of the signals may be read/received, the signals are denoted by $y_0(t)$ to $y_{n-1}(t)$.

The information available in source 200 may be represented by the numbers or symbols $s_0, \ldots, s_{n-1}$. In an embodiment these symbols are real numbers. Each of these symbols may represent one or more information bits. The vector with components $s_0, \ldots, s_{n-1}$ is denoted by s.

The symbols $s_0, \ldots, s_{n-1}$ may be encoded into n other symbols that are denoted by $x_0, \ldots, x_{n-1}$. The vector with components $x_0, \ldots, x_{n-1}$ is denoted by x. In some embodiments the vector x is also a representation for the information in source 200.

The relation between the symbols $x_i$ and the transmitted signal $x_i(t)$ may be as follows. The symbol $x_i$ may represent a characteristic of the signal $x_i(t)$. Examples of such characteristics are amplitude, phase, wavelength and frequency.

In an embodiment, the transmitter 230 may map the symbols $s_0, \ldots, s_{n-1}$ to the symbols $x_0, \ldots, x_{n-1}$ by applying a n×n matrix $C_T$ to s, i.e. x=$C_T$s. In some embodiments the matrix $C_T$ has real entries. Furthermore, $C_T$ is not orthogonal.

In general, the operation of multiplying a matrix A with a vector b is referred to as applying the matrix A to b. It should be understood that such application may be performed by analog and/or digital hardware components or other suitable means that may perform such matrix-vector multiplication.

The transmitter 230 may generate the signals $x_0(t), \ldots, x_{n-1}(t)$ based on the symbols $x_0, \ldots, x_{n-1}$. Such functionality is provided as modulation.

One may further associate a set of n symbols with the signals $y_0(t), \ldots, y_{n-1}(t)$. These symbols are denoted by $y_0, \ldots y_{n-1}$ and may be extracted from $y_0(t), \ldots, y_{n-1}(t)$ by various methods. For instance when $x_0, \ldots, x_{n-1}$ corresponds to the amplitude of $x_0(t), \ldots, x_{n-1}(t)$, the numbers $y_0, \ldots, y_{n-1}$ may be obtained by sampling the signals $y_0(t), \ldots, y_{n-1}(t)$.

In an embodiment the relation between and $y_0, \ldots, y_{n-1}$ and $x_0, \ldots, x_{n-1}$ may be described by a linear relation which may be expressed as y=Hx. Both x and y are vectors where there ith component is given by $x_i$ and $y_i$, respectively. The matrix H is the sampled crosstalk matrix as defined before.

In accordance with aspects of the invention the sampled crosstalk matrix H is a matrix with special structural properties. In some embodiments such special structural property is achieved by inducing symmetry between the signals $x_0(t), \ldots, x_{n-1}(t)$ propagating on the signal paths. Methods to induce such symmetry between the signals $x_0(t), \ldots, x_{n-1}(t)$ propagating on the signal paths are discussed below under Structured crosstalk matrices.

The structural property of H allows the effect of crosstalk to be cancelled more efficiently. In an embodiment the structural property is such that the sampled crosstalk matrix H is a circulant matrix. In such case the effect of H may be cancelled with only a complexity of about O(n log n) instead of $O(n^2)$. This eventually leads to much lower implementation complexity.

A more in-depth discussion of several aspects of the teachings disclosed so far is given below under the Detailed Embodiment Section below. After that, several possible embodiments illustrating various aspects of present teachings are given. Some embodiments may exemplify how symmetry between the signals $x_0(t), \ldots, x_{n-1}(t)$ may be achieved and others may exemplify how the effects of crosstalk may be cancelled efficiently with processing at the transmitter and/or receiver. Yet other embodiments may exemplify how the present teachings may be employed for other applications.

Detailed Embodiment

Many channels with multiple inputs and multiple outputs may be modelled as a linear system. A channel with n inputs and n outputs may be defined by a n×n channel matrix that is denoted by H(t). When the inputs of the channel are given by $x_0(t), \ldots, x_{n-1}(t)$, the channel outputs may be denoted by $y_0(t), \ldots, y_{n-1}(t)$. Furthermore, the channel outputs may be related to the channel inputs by a convolution with the matrix H(t) as given by Eqn. 1.

$$\begin{bmatrix} y_0(t) \\ y_1(t) \\ \vdots \\ y_{n-1}(t) \end{bmatrix} = H(t) * \begin{bmatrix} x_0(t) \\ x_1(t) \\ \vdots \\ x_{n-1}(t) \end{bmatrix} \quad [\text{Eqn. 1}]$$

In Eqn. 1 the operator * denotes the convolution operator. The matrix H(t) may be defined by Eqn. 2.

$$H(t) = \begin{bmatrix} h_{0,0}(t) & h_{0,1}(t) & \ldots & h_{0,n-1}(t) \\ h_{1,0}(t) & & & h_{1,n-1}(t) \\ \vdots & & \ddots & \vdots \\ h_{n-1,0}(t) & h_{n-1,1}(t) & \ldots & h_{n-1,n-1}(t) \end{bmatrix} \quad [\text{Eqn. 2}]$$

The matrix H(t) is called the crosstalk matrix. The function $h_{i,j}(t)$ may be interpreted as the impulse response from the jth channel input to the ith channel output. It is understood that the convolution operator signifies that convolution instead of multiplication is used in the matrix-vector multiplication of Eqn. 1. This implies that for instance $y_i(t)$ can be written as Eqn. 3.

$$y_i(t) = \Sigma_{j=0}^{n-1} h_{i,j}(t) * x_j(t) \quad [\text{Eqn. 3}]$$

In an ideal communication system the matrix H(t) may be a diagonal matrix. In present teachings crosstalk is present and by definition the crosstalk matrix is not a diagonal matrix. The off diagonal elements cause crosstalk between the transmitted signals $x_0(t), \ldots, x_{n-1}(t)$.

An example of a transmitter in accordance with the teachings of this application is now described with reference to FIG. 3. The transmitter 230 comprises a DMOD unit 315 that takes as its input the information in source 200. The information generated by source 200 may represent bits, encoded bits any other convenient way to represent information.

A new set of source symbols may be available on a periodic basis. For instance the source may be an external source of information that generates a new set of source symbols every T seconds where T is a predetermined number that is typically less than 1. T may be for instance 1 nanosecond. The source bits may also be generated outside the communication system.

The DMOD unit 315 may take the information generated by the source 200 at time kT and transform these into a set of n symbols that are denoted by $s_{k,0}, \ldots, s_{k,n-1}$. The symbols $s_{k,0}, \ldots, s_{k,n-1}$ are a representation for the information in source 200. The task of the DMOD unit 315 may be to map a set of information bits to symbols of a signal constellation.

A signal constellation may be defined by a set of predetermined real or complex numbers. Many signal constellations are known to those of skill in the art. Signal constellations with an equal spacing between the constellation symbols are often referred to as M-PAM signal constellations. For example a 2-PAM signal constellation has two constellation symbols and may be defined by the set {−1,1}. A 2-PAM signal constellation is also called a binary phase shift keying (BPSK) signal constellation. Other options are possible. In some embodiments the signal constellation consists of real constellation symbols.

The transmitter 230 comprises a transmitter crosstalk cancellation (TCC) unit 320 that takes as its input the n symbols generated by the DMOD unit 315 and outputs another set of n symbols which are denoted by $x_{k,0}, \ldots, x_{k,n-1}$. In some embodiments the symbols $x_{k,0}, \ldots, x_{k,n-1}$ are a representation for the information in source 200.

In an embodiment the operation of the TCC unit 320 is characterized by a linear operation. The output symbols of the TCC unit 320 may be expressed in terms of the outputs of the DMOD unit 315 as $xC_T s$. In this equation $C_T$ is a n×n matrix. It is understood that the components of x and s are given by $x_{k,0}, \ldots, x_{k,n-1}$ and $s_{k,0}, \ldots, s_{k,n-1}$, respectively. In some embodiments the matrix $C_T$ has real entries and is not an orthogonal matrix.

The symbols generated by the TCC unit 320 are input to a CMOD unit 325. The task of the CMOD unit 325 is to generate a set of n continuous-time signals based on at least part of the numbers provided by the TCC unit 320.

The CMOD unit 325 may perform pulse-amplitude modulation (PAM) with a pulse shape p(t). The pulse shape may be a return-to-zero (RZ) or non-return-to-zero (NRZ) pulse shape. Many other options for pulse shapes are known in the art and may be used. The amplitude of the pulses transmitted on each of the signal paths 115 may be chosen according to the symbols $x_{k,0}, \ldots, x_{k,n-1}$ supplied by the TCC unit 320. The outputs of the CMOD unit 325 are transmitted on the signal paths 115 of the channel 110.

When the CMOD unit 325 performs PAM with a pulse shape p(t), the signal $x_i(t)$ transmitted on the ith signal path of signal paths 115 may be written as Eqn. 4.

$$x_i(t) = \Sigma_k x_{k,i} p(t-kT) \quad [\text{Eqn. 4}]$$

When PAM is used, the channel may also be defined in terms of the response of the channel to the pulse shape p(t). For this purpose the pulse response $p_{i,j}(t)$ may be defined as Eqn. 5.

$$p_{i,j}(t) = h_{i,j}(t) * p(t) \quad [\text{Eqn. 5}]$$

A receiver in accordance with at least one embodiment is now further described with reference to FIG. 4. The input to the receiver 410 are the signals $y_0(t), \ldots, y_{n-1}(t)$ that are present on signal paths 115 of channel 110.

Figure 3:
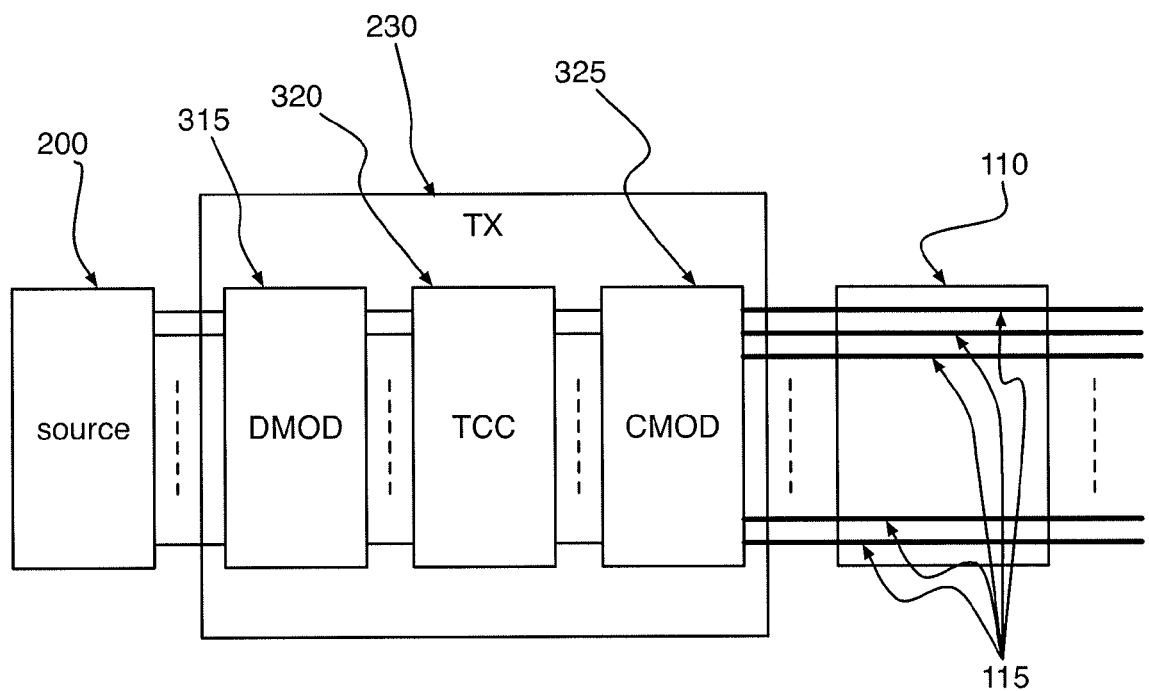
FIG. 3 is a schematic diagram depicting aspects of a transmitter operating over a plurality of signal paths in accordance with at least one embodiment of the invention.

The main task of the receiver is to estimate the information transmitted by the transmitter 230 of FIG. 3. Based on the signals $y_0(t), \ldots, y_{n-1}(t)$, the receiver 410 may generate an estimate for $s_{k,0}, \ldots, s_{k,n-1}$. To accomplish this, the receiver 410 may comprise an ICMOD unit 420, a receiver crosstalk cancellation (RCC) unit 430 and an IDMOD unit 440.

The task of the ICMOD unit 420 is to receive and/or sense the signals present on the signal paths 115. The ICMOD unit 420 may sample output signals $y_0(t), \ldots, y_{n-1}(t)$ at $t = kT_s$ where $T_s$ is a sampling time and k a number that may be an integer.

The samples generated by the ICMOD unit at time $T_s k$ are denoted by $y_{k,0}, \ldots, y_{k,n-1}$. Here it is understood that $y_{k,i} = y_i(kT_s)$.

The receiver 410 may comprise additional functionality. For instance the receiver 410 may comprise a clock-and-data-recovery (CDR) algorithm that is used to find the sample moment $T_s$ according to an optimality criterion such as maximum signal-to-noise ratio.

The operation of sampling should not be considered limiting. Instead of sampling one may also use other operations. One may for instance average or integrate the received signals instead of a pure sampling. Another option is to use a matched filter.

The sampled channel outputs, which are denoted by $y_{k,0}, \ldots, y_{k,n-1}$, may be written at time $kT_s$ as Eqn. 6.

$$\begin{bmatrix} y_{k,0} \\ \vdots \\ y_{k,n-1} \end{bmatrix} = H \begin{bmatrix} x_{k,0} \\ \vdots \\ x_{k,n-1} \end{bmatrix} \quad [\text{Eqn. 6}]$$

The vector y is defined as a vector of size n with components $y_{k,0}, \ldots, y_{k,n-1}$. The matrix H may be expressed as Eqn. 7 and is the sampled crosstalk matrix as defined before.

$$H = \begin{bmatrix} p_{0,0}(kT_s) & p_{0,1}(kT_s) & \cdots & p_{0,n-1}(kT_s) \\ p_{1,0}(kT_s) & p_{1,1}(kT_s) & \cdots & p_{1,n-1}(kT_s) \\ \vdots & \vdots & \ddots & \vdots \\ p_{n-1,0}(kT_s) & p_{n-1,1}(kT_s) & \cdots & p_{n-1,n-1}(kT_s) \end{bmatrix} \quad [\text{Eqn. 7}]$$

The input to the RCC unit 430 are the samples/numbers $y_{k,0}, \ldots, y_{k,n-1}$. The RCC unit 430 performs an operation on $y_{k,0}, \ldots, y_{k,n-1}$ that may facilitate crosstalk cancellation. In an embodiment such operation is a linear operation characterized by a n×n matrix $C_R$. The outputs of the RCC unit are denoted by $z_{k,0}, \ldots, z_{k,n-1}$ and may be expressed as $z = C_R y$. Here it is understood that z and y are vectors with components $z_{k,0}, \ldots, z_{k,n-1}$ and $y_{k,0}, \ldots, y_{k,n-1}$, respectively. In some embodiments the matrix $C_R$ has real entries and is not an orthogonal matrix.

The IDMOD unit 440 may recover the information originally present in source 200 of FIG. 3 from $z_{k,0}, \ldots, z_{k,n-1}$. For this purpose the IDMOD unit 440 may for instance perform demapping of the signal constellation symbols to the original source bits. The final information is available at 450.

In accordance with aspects of the invention the sampled crosstalk matrix H is a matrix with special structural properties. These structural properties may follow from the structural properties of the crosstalk matrix H(t). In some embodiments such structural property is achieved by inducing symmetry between the signals $x_0(t), \ldots, x_{n-1}(t)$ propagating on the signal paths.

The special structural properties of the sampled crosstalk matrix H allows the effect of crosstalk to be cancelled more efficiently. In an embodiment the structural property is such that the sampled crosstalk matrix H is a circulant matrix. In such case the effect of H may be cancelled with only a complexity of about $O(n \log n)$ instead of $O(n^2)$ which eventually leads to much lower implementation complexity.

For instance when the channel comprises n=32 signal paths, cancellation of crosstalk would require about 1024 multiplications. Hardware multipliers may implement such multiplications and 1024 of such multipliers may be required to achieve sufficient throughput. With present teachings cancellation of the crosstalk would require in the order of 160 multipliers, which is a substantial savings.

Detailed Operation of the TCC and RCC Units

The transmitter 230 of FIG. 3 may represent information by symbols $s_{k,0}, \ldots, s_{k,n-1}$ and generate symbols $x_{k,0}, \ldots, x_{k,n-1}$ by application of the matrix $C_T$. The task of the receiver 410 of FIG. 4 comprises the detection of the symbols $s_{k,0}, \ldots, s_{,n-1}$ based on the sampled channel outputs $y_{k,0}, \ldots, y_{k,n-1}$. For this purpose the receiver 410 may apply the matrix $C_R$ to $y_{k,0}, \ldots, y_{k,n-1}$ to generate the symbols $z_{k,0}, \ldots, z_{k,n-1}$.

In some embodiments the relation between symbols $z_{k,0}, \ldots, z_{k,n-1}$ and symbols $s_{k,0}, \ldots, s_{k,n-1}$ can be expressed by a diagonal matrix. In such case the communication is free of crosstalk.

In some embodiments the cancellation of the crosstalk may be performed at the transmitter by the TCC unit 320 of FIG. 3 by an appropriate choice of the matrix $C_T$. In other embodiments the cancellation of the crosstalk may be performed at the receiver by the RCC unit 430 of FIG. 4 by an appropriate choice of the matrix $C_R$.

The relation between the vectors z and s may be expressed as $z = C_R H C_T s$. To cancel crosstalk one requires that $C_R H C_T = D_n$ where $D_n$ denotes a diagonal matrix of size n×n. In some embodiments, the diagonal matrix $D_n$ is the identity matrix of size n which is denoted by $I_n$. The equality may be achieved by various choices of $C_T$ and $C_R$.

In some embodiments, the signal paths and/or transmitter and/or receiver are configured such that the structural properties of the sampled crosstalk matrix H are such that H is a circulant matrix.

A circulant sampled crosstalk matrix H can be diagonalized as WH=DW where W is the discrete Fourier transform (DFT) matrix of size n. Furthermore, D is a n×n diagonal matrix where the diagonal elements are denoted by $d_i$ for $i = 0, \ldots, n-1$. The $d_i$ are the eigenvalues of the matrix H. The inverse of the matrix D is denoted by $D^{-1}$. The ith diagonal element of $D^{-1}$ is given by the reciprocal of $d_i$.

Instead of the DFT matrix W, the inverse discrete Fourier transform (IDFT) matrix may be used to diagonalize H. The inverse of the DFT matrix is the complex conjugate transpose of W which is denoted by $W^H$.

Embodiments for cancellation of crosstalk when the sampled crosstalk matrix is circulant are now further described with reference to FIG. 5-6.

Figure 5:
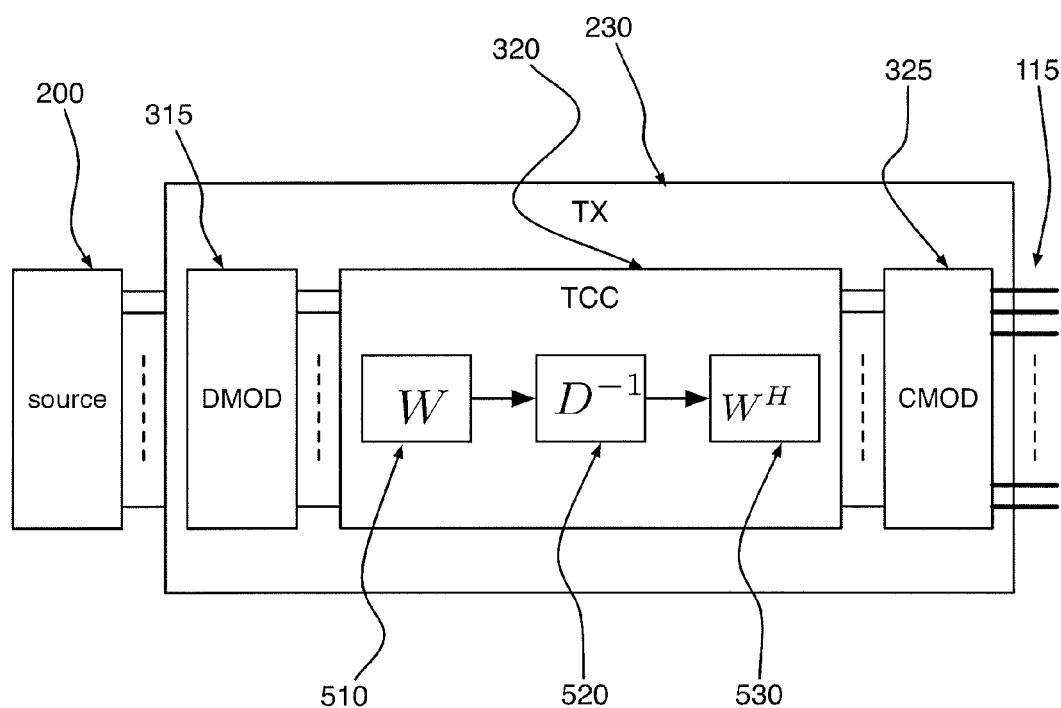
FIG. 5 is a schematic diagram depicting aspects of a transmitter in accordance with at least one embodiment of the invention.

FIG. 5 further exemplifies a transmitter 230 that operates over a channel that comprises multiple signal paths 115. A sampled crosstalk matrix H may characterize the channel. In an embodiment H is a circulant matrix and may be written as $H=W^H DW$.

The input of the TCC unit 320 are the symbols $s_{k,0}, \ldots, s_{k,n-1}$. The TCC unit 320 generates the output symbols $x_{k,0}, \ldots, x_{k,n-1}$ as $x=C_T s$ where $C_T W^H D^{-1} W$. The matrix $C_T$ is the inverse of the circulant sampled crosstalk matrix.

The transmitter 230 may comprise the units 510, 520, 530 whose joint operation may apply the matrix $C_T$ to symbols $s_{k,0}, \ldots, s_{k,n-1}$. Unit 510 may apply the matrix W to the vector of symbols s. Unit 520 operates on the output of unit 510 and may apply the matrix $D^{-1}$ to the outputs of unit 510. Unit 530 may apply the matrix $W^H$ to the output of unit 520 to generate the symbols $x_{k,0}, \ldots, x_{k,n-1}$.

The operation of the transmitter 230 of FIG. 5 is such that at the receiver the sampled channel outputs $y_{k,0}, \ldots, y_{k,n-1}$ as defined by Eqn. 6 can be written as $y=Hx=W^H DWC_T s=W^H DWW^H D^{-1} Ws=s$. Hence the sampled channel outputs y are equal to the symbols s and crosstalk free transmission is achieved. A receiver operating in conjunction with the transmitter of FIG. 5 may use a $C_R$ that is equal to $C_R=I_n$. This shows that no additional crosstalk cancellation is required at such receiver.

Figure 4:
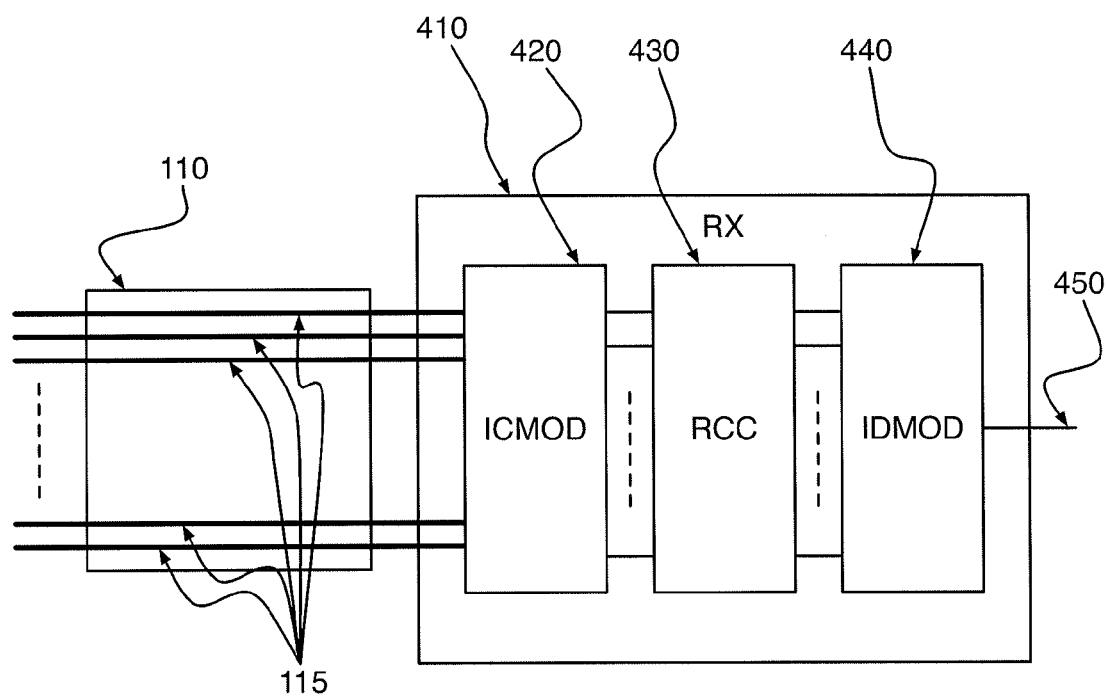
FIG. 4 is a schematic diagram depicting aspects of a receiver receiving from a plurality of signal paths in accordance with at least one embodiment of the invention.
Figure 6:
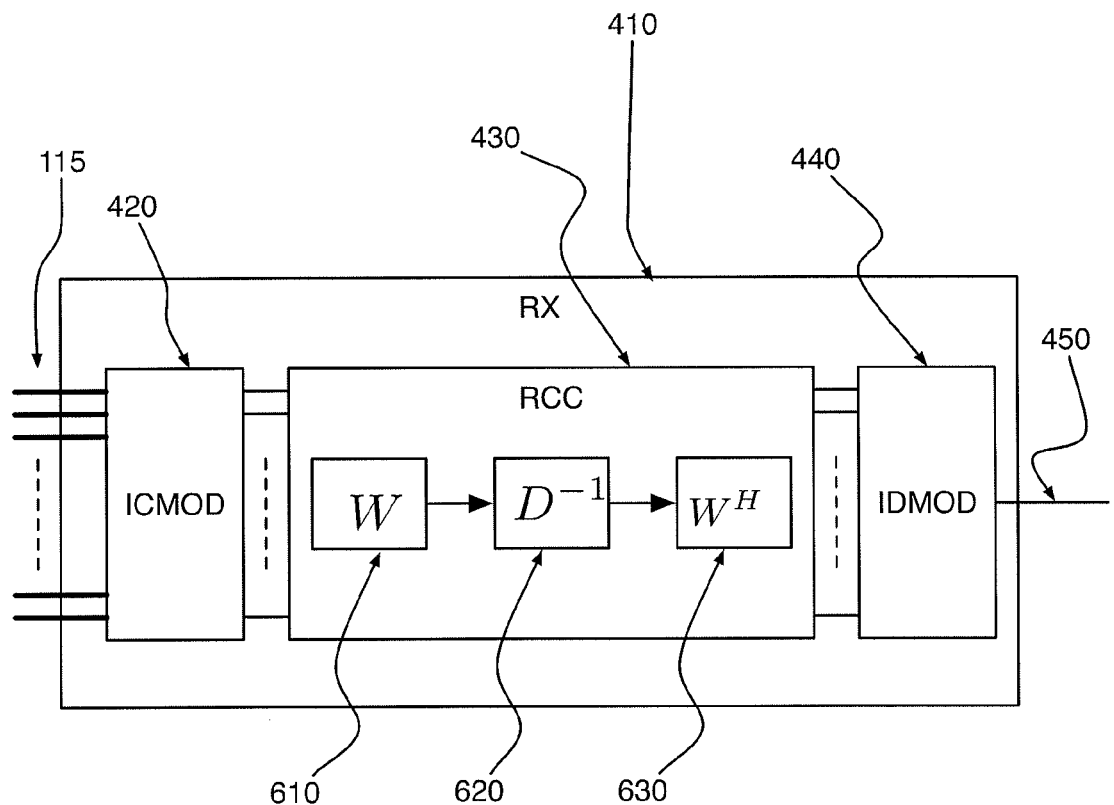
FIG. 6 is a schematic diagram depicting aspects of a receiver in accordance with at least one embodiment of the invention.

FIG. 6 further exemplifies a receiver 410 of FIG. 4 that operates over a channel that comprises multiple signal paths 115. The input to the RCC unit 430 are the sampled channel outputs $y_{k,0}, \ldots, y_{k,n-1}$. The RCC unit 430 generates the output symbols $z_{k,0}, \ldots, z_{k,n-1}$ as $z=C_R y$ where $C_R=W^H D^{-1} W$. The matrix $C_R$ is the inverse of the circulant sampled crosstalk matrix.

The RCC unit 430 may comprise the units 610, 620 and 630 whose joint operation may apply the matrix $C_R$ to the sampled channel outputs. Unit 610 may apply the matrix W to the sampled channel outputs $y_{k,0}, \ldots, y_{k,n-1}$. Unit 620 may apply the matrix $D^{-1}$ to the output of unit 610. Unit 630 may apply the matrix $W^H$ to the output of unit 620 to generate symbols $z_{k,0}, \ldots, z_{k,n-1}$.

In an embodiment, a transmitter operates in conjunction with the receiver 410 of FIG. 6. Such transmitter may generate the symbols $x_{k,0}, \ldots, x_{k,n-1}$ as $x=C_T s$ where $C_T=I_n$. With the operation of the receiver of FIG. 6, the symbols $z_{k,0}, \ldots, z_{k,n-1}$ may be expressed as $z=W^H D^{-1} Wy=W^H D^{-1} WHs=W^H D^{-1} WW^H DWs=s$. The symbols z are equal to the symbols s and crosstalk free transmission is achieved.

In some embodiments the sampled crosstalk matrix is circulant and has real entries. Furthermore, one of the matrices $C_T$ and $C_R$ is chosen as the inverse of the sampled crosstalk matrix. In this case the respective matrix $C_T$ or $C_R$ is a circulant matrix with real entries as well. Furthermore, this implies that this matrix is not an orthogonal matrix. This follows from the fact that an orthogonal and circulant matrix can only be equal to a scaled version of the identity matrix $I_n$ which contradicts the definition of H as a matrix that is not diagonal.

A communication system employing the transmitter of FIG. 5 cancels crosstalk at the transmitter and no additional crosstalk cancellation may be required at the receiver. A communication system employing the receiver of FIG. 6 cancels crosstalk at the receiver and no additional crosstalk cancellation may be required at the transmitter.

As one of skill in the art will recognize the application of the DFT and IDFT matrices W and $W^H$ may be performed with a fast algorithm such as the fast Fourier transform (FFT). This significantly reduces the complexity and allows crosstalk to be cancelled with a complexity of about $O(n \log n)$ instead of $O(n^2)$ which would be the complexity of the direct application of the inverse of the sampled crosstalk matrix H. This leads to a much lower hardware and implementation complexity.

A family of FFT algorithms may be the radix-2 type FFT algorithms. The radix-2 algorithms rely on the fact that n is an integer power of 2. In a similar way Radix-p algorithms may be used for the computation of the DFT and/or IDFT where n can be expressed as an integer power of p.

Another family of FFT algorithms is the family of prime-factor algorithms (PFAs). The main idea of the PFA is to break down n into a product of relatively prime factors. For instance when n=24, n may be written as n=3×8. As known to those of skill in the art, efficient algorithms can be derived for the computation of the DFT and IDFT when n can be factored into a product of relatively prime factors.

Structured Crosstalk Matrices

According to the teachings of this application, crosstalk may be cancelled efficiently when symmetry is induced between the signals conveyed on the signal paths. In some embodiments such symmetry leads to a crosstalk matrix H(t) and/or a sampled crosstalk matrix H that are circulant.

Figure 7:
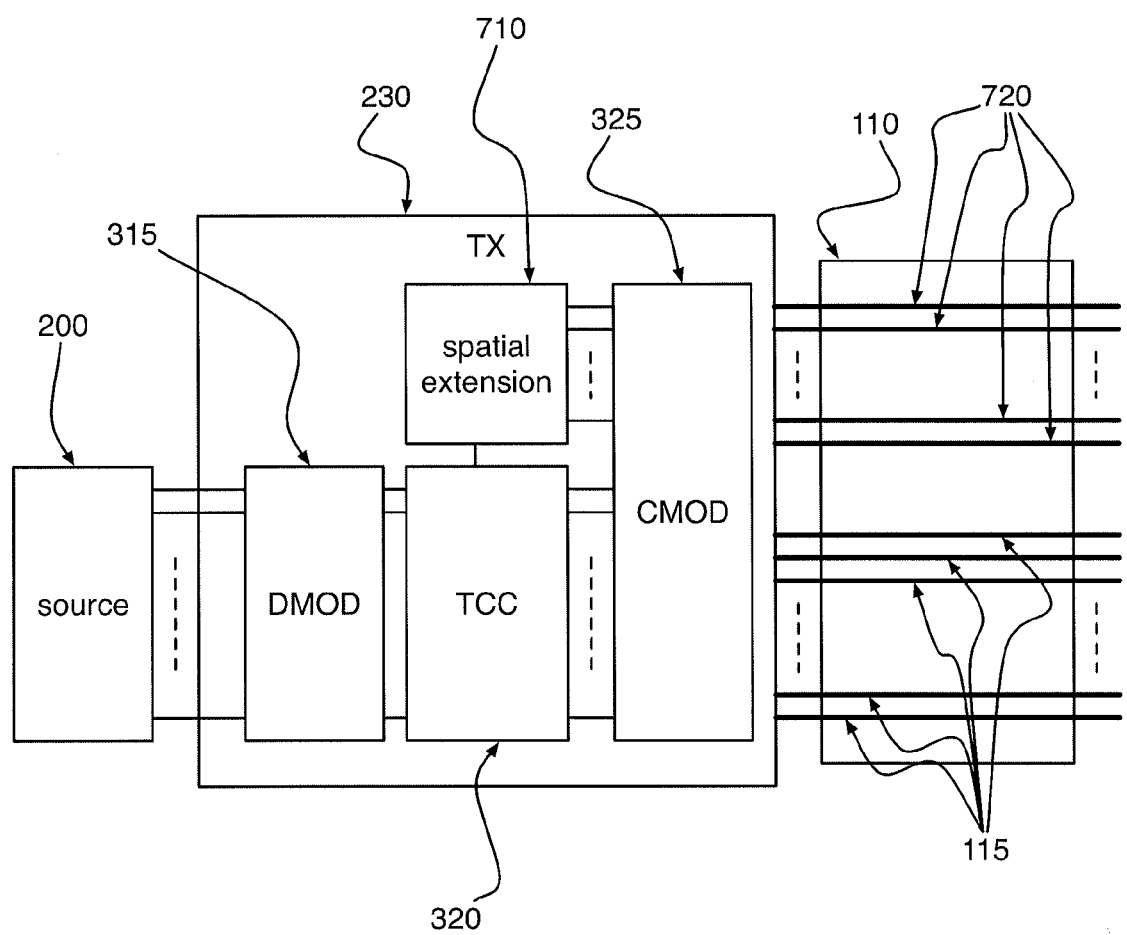
FIG. 7 is a schematic diagram depicting aspects of a transmitter operating over a plurality of signal paths in accordance with at least one embodiment of the invention.

A first method to induce symmetry between the signals conveyed on the signal paths is now further described with reference to FIG. 7. FIG. 7 exemplifies a channel 110 that comprises n signal paths 115. The channel 110 further comprises a set of L additional signal paths 720. The signal paths 720 are referred to as the spatial extension (SE) signal paths.

The transmitter 230 comprises a spatial extension (SE) unit 710. The SE unit 710 takes as its input the outputs $x_{k,0}, \ldots, x_{k,n-1}$ of the TCC unit 320 and generates the symbols $x_{k,n}, \ldots, x_{k,n+L-1}$. The input to the CMOD unit 325 are the symbols $x_{k,0}, \ldots, x_{k,n+L-1}$. The task of the CMOD unit 325 is to generate a set of n+L continuous-time signals based on at least part of the symbols provided by the TCC unit 320 and the SE unit 710.

In an embodiment, the CMOD unit 325 may perform PAM with a pulse shape p(t). In this case the CMOD unit 325 may generate the output signals $x_0(t), \ldots, x_{n+L-1}(t)$ as given by Eqn. 4. The signals $x_0(t), \ldots, x_{n+L-1}(t)$ may be transmitted on the signal paths 115 of the channel 110.

In an embodiment the symbols $x_{k,n}, \ldots, x_{k,n+L-1}$ and the corresponding signals $x_n(t), \ldots, x_{n+L-1}(t)$ are generated in such a way that the crosstalk between signals $x_0(t), \ldots, x_{n-1}(t)$ is described by a crosstalk matrix H(t) that is circulant. In further embodiments where PAM is used, the sampled channel crosstalk matrix H is circulant also.

A circulant crosstalk matrix H(t) may be achieved by choosing $x_{k,n}, \ldots, x_{k,n+L-1}$ as a subset of $x_{k,0}, \ldots, x_{k,n-1}$. In such case the signals $x_n(t), \ldots, x_{n+L-1}(t)$ transmitted on the extension signal paths 720 are a copy of some of the signals $x_0(t), \ldots, x_{n-1}(t)$ which are transmitted on the signal paths 115.

Figure 8A:
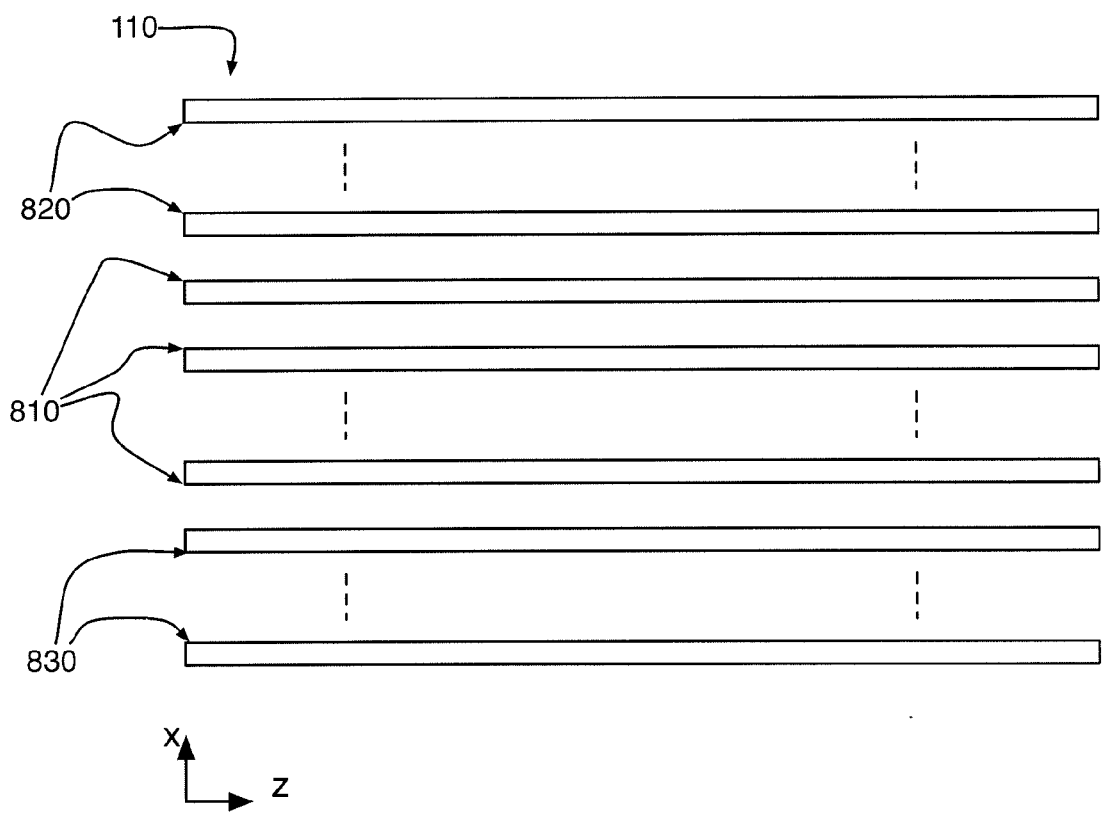
FIGS. 8A and 8B are schematic diagrams depicting aspects of a channel comprising a plurality of signal paths in accordance with at least one embodiment of the invention.
Figure 8B:
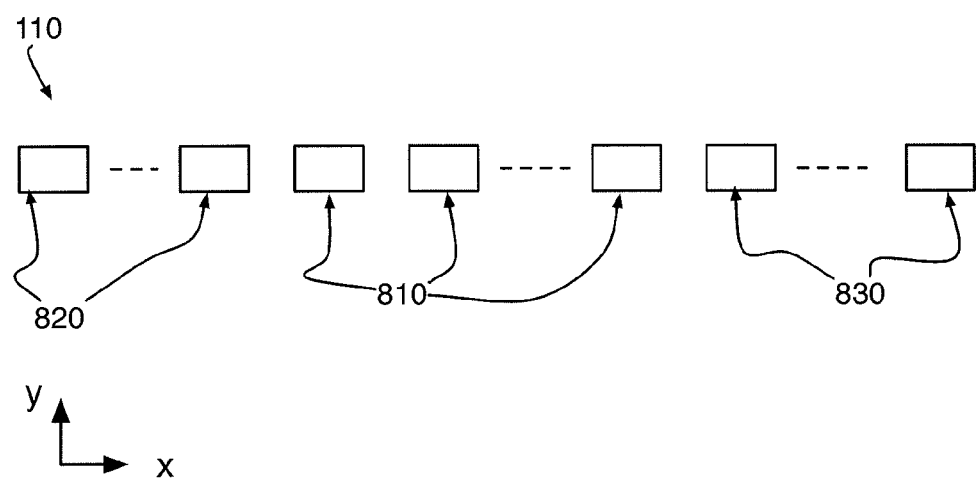

In an embodiment, the signal paths are configured in linear array. How to obtain a circulant crosstalk matrix for such signal path configuration is now further described with reference to FIG. 8A and FIG. 8B. FIG. 8A and FIG. 8B exemplify a channel 110 that comprises n signal paths 810. FIG. 8A is a top-level view of the signal paths while FIG. 8B is a cross sectional view of the signal paths.

The configuration of FIG. 8A and FIG. 8B may be an example of a MCTL where the signal paths 810 are conductors surrounded by a dielectric medium.

The channel comprising signal paths 810 may be characterized by a matrix H(t) as defined by Eqn. 2.

In an embodiment, the configuration of the signal paths of the channel is such that the components $h_{i,j}(t)$ of the matrix H(t) are given by Eqn. 8 in case |i−j|=|k−l| holds.

$$h_{i,j}(t) = h_{k,l}(t) \quad [\text{Eqn. 8}]$$

In case Eqn. 8 holds the matrix H(t) may be expressed as Eqn. 9 where $h_k(t) = h_{i,j}(t)$ for k=|i−j|.

$$H(t) = \begin{bmatrix} h_0(t) & h_1(t) & h_2(t) & h_3(t) & \ldots & h_{n-1}(t) \\ h_1(t) & h_0(t) & h_1(t) & h_2(t) & \ldots & h_{n-2}(t) \\ h_2(t) & h_1(t) & h_0(t) & h_1(t) & \ldots & h_{n-3}(t) \\ \vdots & & & & \ddots & \vdots \\ h_{n-1}(t) & h_{n-2}(t) & h_{n-3}(t) & & \ldots & h_0(t) \end{bmatrix} \quad [\text{Eqn. 9}]$$

Eqn. 8 may be realized by introducing $L_1$ dummy signal paths 820 and $L_2$ dummy signal paths 830. The integers $L_1$ and $L_2$ are chosen large enough such that Eqn. 8 holds or at least holds with sufficient precision. Sufficient precision may mean for instance that equality holds in Eqn. 8 within an error margin of 5%. From a physical point of view the dummy signal paths 820 and 830 render the physical environment for each of the signal paths 810 equivalent.

In many situations encountered in practice there exists a d such that for i>d the value of $h_i(t)$ is negligible small for all t. How small $h_i(t)$ needs to be to be negligible depends on the application. For instance $h_i(t)$ may be negligible small when $h_i(t)$ is less than 0.05 for all t. Without loss of generality it is assumed that $h_i(t)=0$ for the integer d where for all i>d $h_i(t)$ is negligible small.

An example of a matrix H(t) where $h_i(t)$ is negligible small for i>2 is given by Eqn. 10 for the case where the number of signal paths 810 is equal to 8 (n=8).

$$H(t) = \begin{bmatrix} h_0(t) & h_1(t) & h_2(t) & 0 & 0 & 0 & 0 & 0 \\ h_1(t) & h_0(t) & h_1(t) & h_2(t) & 0 & 0 & 0 & 0 \\ h_2(t) & h_1(t) & h_0(t) & h_1(t) & h_2(t) & 0 & 0 & 0 \\ 0 & h_2(t) & h_1(t) & h_0(t) & h_1(t) & h_2(t) & 0 & 0 \\ 0 & 0 & h_2(t) & h_1(t) & h_0(t) & h_1(t) & h_2(t) & 0 \\ 0 & 0 & 0 & h_2(t) & h_1(t) & h_0(t) & h_1(t) & h_2(t) \\ 0 & 0 & 0 & 0 & h_2(t) & h_1(t) & h_0(t) & h_1(t) \\ 0 & 0 & 0 & 0 & 0 & h_2(t) & h_1(t) & h_0(t) \end{bmatrix} \quad [\text{Eqn. 10}]$$

In an embodiment, the signal paths 820 and 830 are not only used as dummy signal paths to render the physical environment for each of the signal paths 810 equivalent. Signal paths 820, 830 may correspond to the SE signal paths 720 of FIG. 7.

Let $x_n(t), \ldots, x_{n+L1-1}(t)$ denote the signals that may be transmitted by CMOD unit 325 of FIG. 7 on SE signal paths 830. Furthermore, let $x_{-L2}(t), \ldots, x_{-1}(t)$ denote the signals that may be transmitted by CMOD unit 325 of FIG. 7 on SE signal paths 820.

In an embodiment, the operation of the SE unit 710 and CMOD unit 325 of FIG. 7 is such that the signals $x_n(t), \ldots, x_{n+L1-1}(t)$ are generated as $x_{i+n}(t)=x_i(t)$ for i=0, ..., $L_1$−1 and the signals $x_{-L2}(t), \ldots, x_{-1}(t)$ as $x_{-i}(t)=x_{n-i}(t)$ for i=1, ..., $L_2$.

Figure 9:
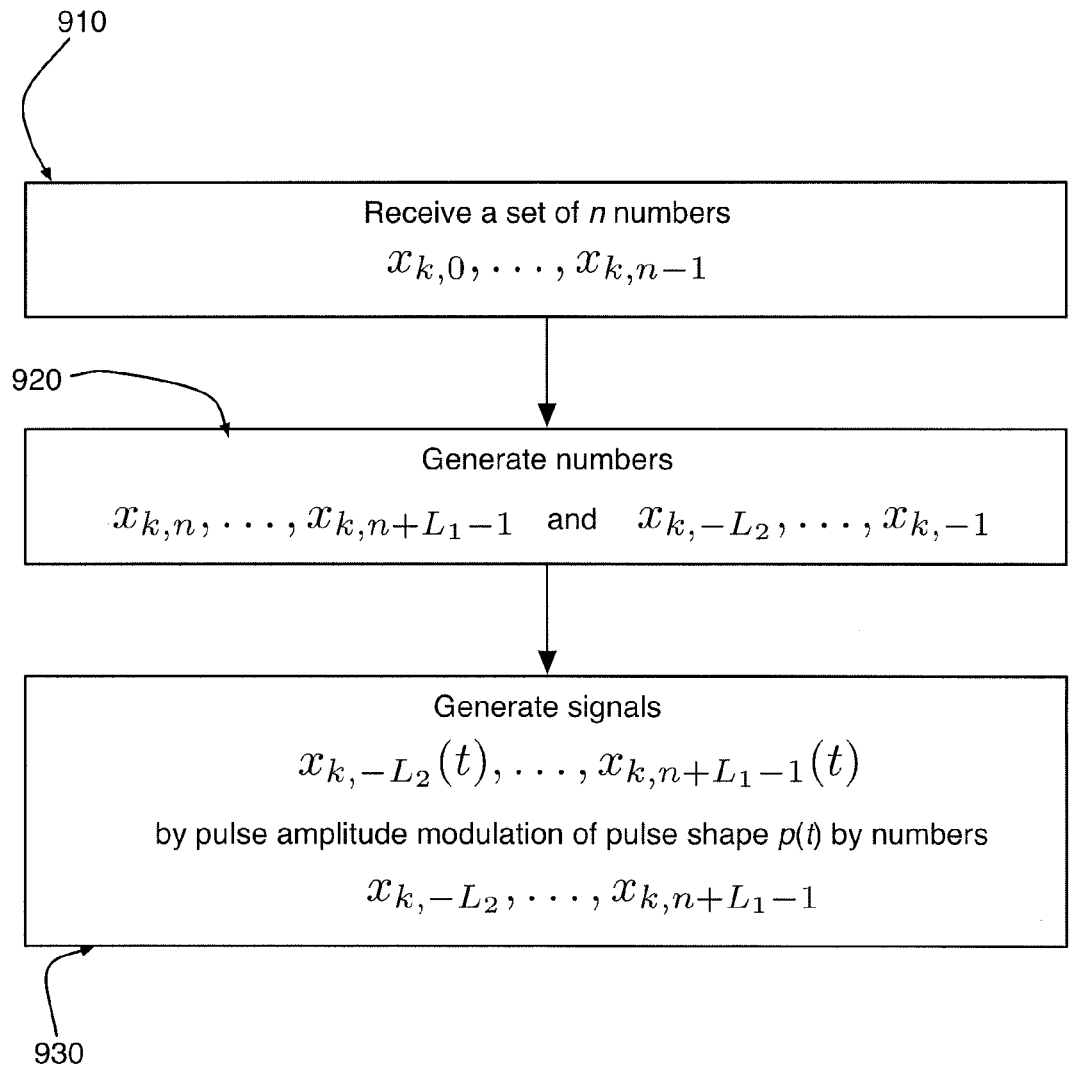
FIG. 9 exemplifies a process that may be implemented by a transmitter in accordance with at least one embodiment of the invention.

A process that may be implemented by a transmitter 230 to accomplish this is now further described with reference to FIG. 9. The input to the process exemplified in FIG. 9 are the symbols $x_{k,0}, \ldots, x_{k,n-1}$ as may be generated by the TCC unit of e.g. FIG. 7. The symbols $x_{k,0}, \ldots, x_{k,n-1}$ are received in Step 910. In Step 920 the symbols $x_{k,n}, \ldots, x_{k,n+L1-1}$ and $x_{k,-L2}, \ldots, x_{k,-1}$ are generated. The symbols $x_{k,n}, \ldots, x_{k,n+L1-1}$ may be generated by the SE unit 710 of FIG. 7 as $x_{k,i+n}=x_i$ for i=0, ..., $L_1$−1. The symbols $x_{k,-L2}, \ldots, x_{k,-1}$ may be generated by the SE unit 710 of FIG. 7 as $x_{-i}=x_{n-i}$ for i=1, ..., $L_2$.

In Step 930, the signals $x_n(t), \ldots, x_{n+L1-1}$ and $x_{-L2}(t), \ldots, x_{-1}(t)$ may be generated by modulating a pulse shape p(t) by the symbols $x_{k,n}, \ldots, x_{k,n+L1-1}$ and $x_{k,-L2}, \ldots, x_{k,-1}$, respectively. Furthermore, the signals $x_0(t), \ldots, x_{n-1}(t)$ may be generated by modulating a pulse shape p(t) by the symbols $x_{k,0}, \ldots, x_{k,n-1}$. The signals $x_0(t), \ldots, x_{n-1}(t)$ may be transmitted on signal paths 810 of FIGS. 8A, 8B. The signals $x_n(t), \ldots, x_{n+L1-1}$ and $x_{-L2}(t), \ldots, x_{-1}(t)$ may be transmitted on SE extension signal paths 830 and 820, respectively. In an embodiment, the integers $L_1$ and/or $L_2$ may be chosen larger than or equal to the integer i for which $h_i(t)$ is negligible small for all t.

In an embodiment, the addition of the SE signal paths 720 of FIG. 7 together with the operation the SE unit 710 is such that the crosstalk matrix H(t) becomes a circulant matrix. How this may be achieved is now further illustrated for a transmitter operating on n=8 signal paths.

Figure 10:
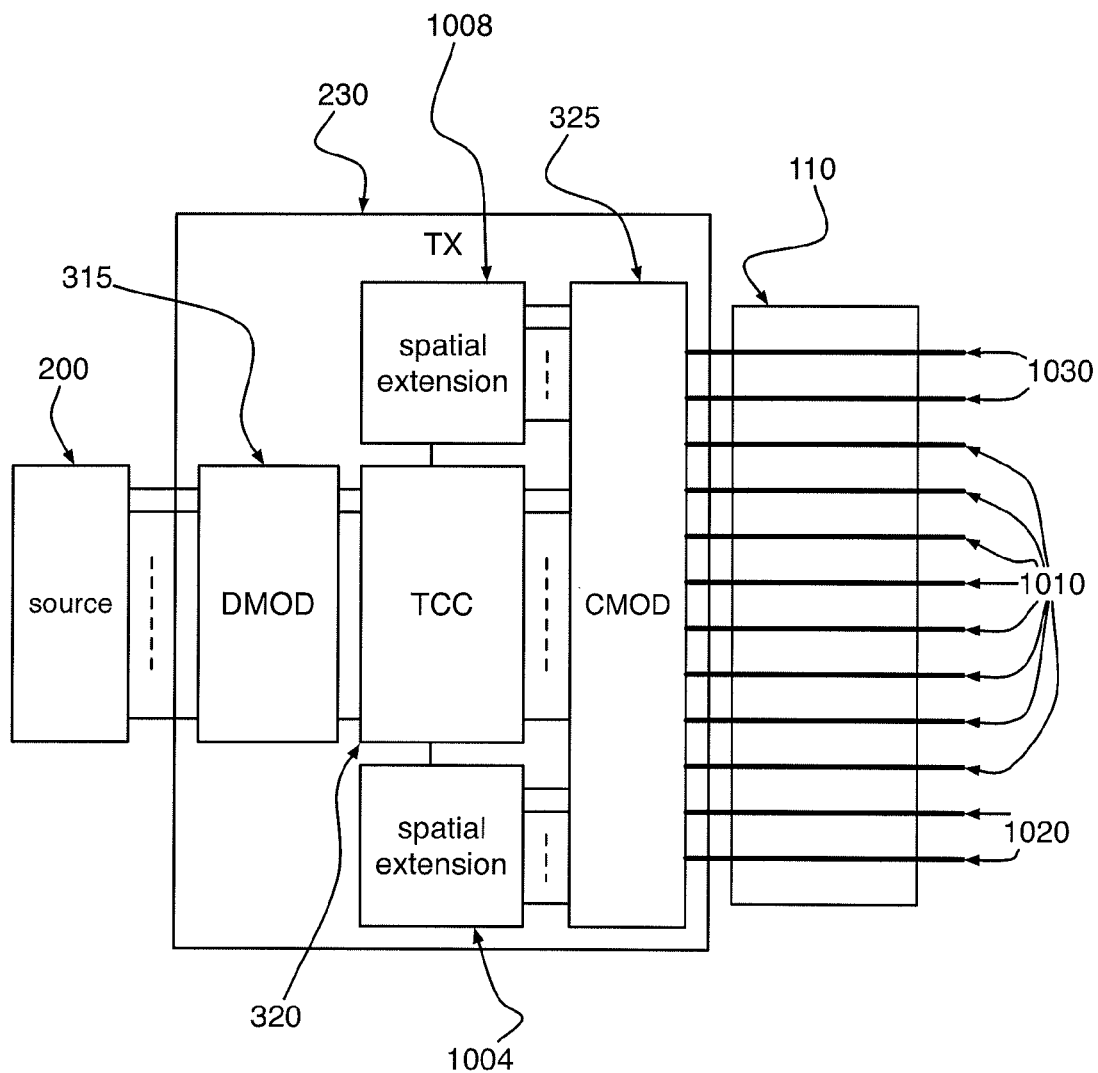
FIG. 10 is a schematic diagram depicting aspects of a transmitter operating over a plurality of signal paths in accordance with at least one embodiment of the invention.

FIG. 10 exemplifies a transmitter 230 that may operate according to present teachings. For this purpose the transmitter 230 may comprise a DMOD unit 315, a TCC unit 320, SE units 1004, 1008 and a CMOD unit 325. The transmitter exemplified in FIG. 10 operates over channel 110. The channel 110 comprises n=8 signal paths 1010 on which signals $x_0(t), \ldots, x_7(t)$ are transmitted. The channel 110 further comprises the SE signal paths 1020 and 1030.

The channel 110 for signals $x_0(t), \ldots, x_7(t)$ may be defined by an 8×8 crosstalk matrix H(t). It is assumed that the SE signal paths 1020, 1030 render each of the signal paths 1010 physically equivalent or approximately equivalent such that the crosstalk matrix H(t) has the form of Eqn. 9. Furthermore, it is assumed that $h_i(t)$ is negligible small for i>2 in which case the crosstalk matrix H(t) is given by Eqn. 10.

The SE unit 1004 may generate numbers $x_{k,8}$ and $x_{k,9}$ based on the numbers $x_{k,0}, \ldots, x_{k,7}$ which are generated by the TCC unit 320. The numbers $x_{k,8}$ and $x_{k,9}$ may be generated as $x_{k,8}=x_0$ and $x_{k,9}=x_1$. The CMOD unit 325 may generate signals $x_{k,8}(t)$ and $x_{k,9}(t)$ based on numbers $x_{k,8}$ and $x_{k,9}$ by PAM modulation. The signals $x_{k,8}(t)$ and $x_{k,9}(t)$ may be transmitted on SE signal paths 1020.

The SE unit 1008 may generate numbers $x_{k,-2}$ and $x_{k,n-1}$ based on the numbers $x_{k,0}, \ldots, x_{k,7}$ which are generated by the TCC unit 320. The numbers $x_{k,-2}$ and $x_{k,n-1}$ may be generated as $x_{k,-2}=x_6$ and $x_{k,-1}=x_7$. The CMOD unit 325 may generate signals $x_{k,-2}(t)$ and $x_{k,-1}(t)$ based on numbers $x_{k,-2}$ and $x_{k,-1}$ by PAM modulation. The signals $x_{k,-2}(t)$ and $x_{k,-1}(t)$ may be transmitted on SE signal paths 1030.

The effect of such operation of the transmitter 230 is that the relation between the signals $y_0(t), \ldots, y_7(t)$ and signals $x_0(t), \ldots, x_7(t)$ may be described by crosstalk matrix H(t) that has become circulant. This may be observed by considering the relation between the signals $y_{-2}(t), \ldots, y_2(t)$ which may be expressed as Eqn. 11.

$$\begin{bmatrix} y_{-2}(t) \\ y_{-1}(t) \\ y_0(t) \\ y_1(t) \\ y_2(t) \\ y_3(t) \\ y_4(t) \\ y_5(t) \\ y_6(t) \\ y_7(t) \\ y_8(t) \\ y_9(t) \end{bmatrix} = \begin{bmatrix} h_0(t) & h_1(t) & h_2(t) & 0 & 0 & 0 & 0 & 0 & 0 & 0 & 0 & 0 \\ h_1(t) & h_0(t) & h_1(t) & h_2(t) & 0 & 0 & 0 & 0 & 0 & 0 & 0 & 0 \\ h_2(t) & h_1(t) & h_0(t) & h_1(t) & h_2(t) & 0 & 0 & 0 & 0 & 0 & 0 & 0 \\ 0 & h_2(t) & h_1(t) & h_0(t) & h_1(t) & h_2(t) & 0 & 0 & 0 & 0 & 0 & 0 \\ 0 & 0 & h_2(t) & h_1(t) & h_0(t) & h_1(t) & h_2(t) & 0 & 0 & 0 & 0 & 0 \\ 0 & 0 & 0 & h_2(t) & h_1(t) & h_0(t) & h_1(t) & h_2(t) & 0 & 0 & 0 & 0 \\ 0 & 0 & 0 & 0 & h_2(t) & h_1(t) & h_0(t) & h_1(t) & h_2(t) & 0 & 0 & 0 \\ 0 & 0 & 0 & 0 & 0 & h_2(t) & h_1(t) & h_0(t) & h_1(t) & h_2(t) & 0 & 0 \\ 0 & 0 & 0 & 0 & 0 & 0 & h_2(t) & h_1(t) & h_0(t) & h_1(t) & h_2(t) & 0 \\ 0 & 0 & 0 & 0 & 0 & 0 & 0 & h_2(t) & h_1(t) & h_0(t) & h_1(t) & h_2(t) \\ 0 & 0 & 0 & 0 & 0 & 0 & 0 & 0 & h_2(t) & h_1(t) & h_0(t) & h_1(t) \\ 0 & 0 & 0 & 0 & 0 & 0 & 0 & 0 & 0 & h_2(t) & h_1(t) & h_0(t) \end{bmatrix} \begin{bmatrix} x_6(t) \\ x_7(t) \\ x_0(t) \\ x_1(t) \\ x_2(t) \\ x_3(t) \\ x_4(t) \\ x_5(t) \\ x_6(t) \\ x_7(t) \\ x_0(t) \\ x_1(t) \end{bmatrix} \quad [\text{Eqn. 11}]$$

From Eqn. 11 it may be derived that in terms of signals $x_0(t), \ldots, x_7(t)$ the received signals $y_0(t), \ldots, y_7(t)$ may be expressed as Eqn. 12. The 8×8 matrix in Eqn. 12 may be interpreted as the effective crosstalk matrix $H(t)$. The effective crosstalk matrix is still referred to as the crosstalk matrix for signal paths 1010. As is clear from Eqn. 12 the crosstalk matrix $H(t)$ has become circulant.

$$\begin{bmatrix} y_0(t) \\ y_1(t) \\ y_2(t) \\ y_3(t) \\ y_4(t) \\ y_5(t) \\ y_6(t) \\ y_7(t) \end{bmatrix} = \begin{bmatrix} h_0(t) & h_1(t) & h_2(t) & 0 & 0 & 0 & h_2(t) & h_1(t) \\ h_1(t) & h_0(t) & h_1(t) & h_2(t) & 0 & 0 & 0 & h_2(t) \\ h_2(t) & h_1(t) & h_0(t) & h_1(t) & h_2(t) & 0 & 0 & 0 \\ 0 & h_2(t) & h_1(t) & h_0(t) & h_1(t) & h_2(t) & 0 & 0 \\ 0 & 0 & h_2(t) & h_1(t) & h_0(t) & h_1(t) & h_2(t) & 0 \\ 0 & 0 & 0 & h_2(t) & h_1(t) & h_0(t) & h_1(t) & h_2(t) \\ h_2(t) & 0 & 0 & 0 & h_2(t) & h_1(t) & h_0(t) & h_1(t) \\ h_1(t) & h_2(t) & 0 & 0 & 0 & h_2(t) & h_1(t) & h_0(t) \end{bmatrix} \begin{bmatrix} x_0(t) \\ x_1(t) \\ x_2(t) \\ x_3(t) \\ x_4(t) \\ x_5(t) \\ x_6(t) \\ x_7(t) \end{bmatrix} \quad [\text{Eqn. 12}]$$

In a similar way an effective sampled crosstalk matrix H may be defined relating the numbers $y_{k,0}, \ldots, y_{k,7}$ and $x_{k,0}, \ldots, x_{k,7}$ according to Eqn. 7 by the sampled crosstalk matrix H. This sampled crosstalk matrix H has become circulant also.

As one of skill in the art will recognize the embodiments exemplified should not be considered limiting. For instance the embodiments may be extended to operate on a general number of signal paths n. A different numbers of SE signal paths may be used. Furthermore, different spatial configurations of the signal paths may be used leading to symmetry between the signals transmitted on the signal paths.

Other methods to induce symmetry between the signals conveyed on the signal paths exist. Several embodiments that may lead to circulant crosstalk matrices are now further described with reference to FIG. 11-14.

Figure 11:
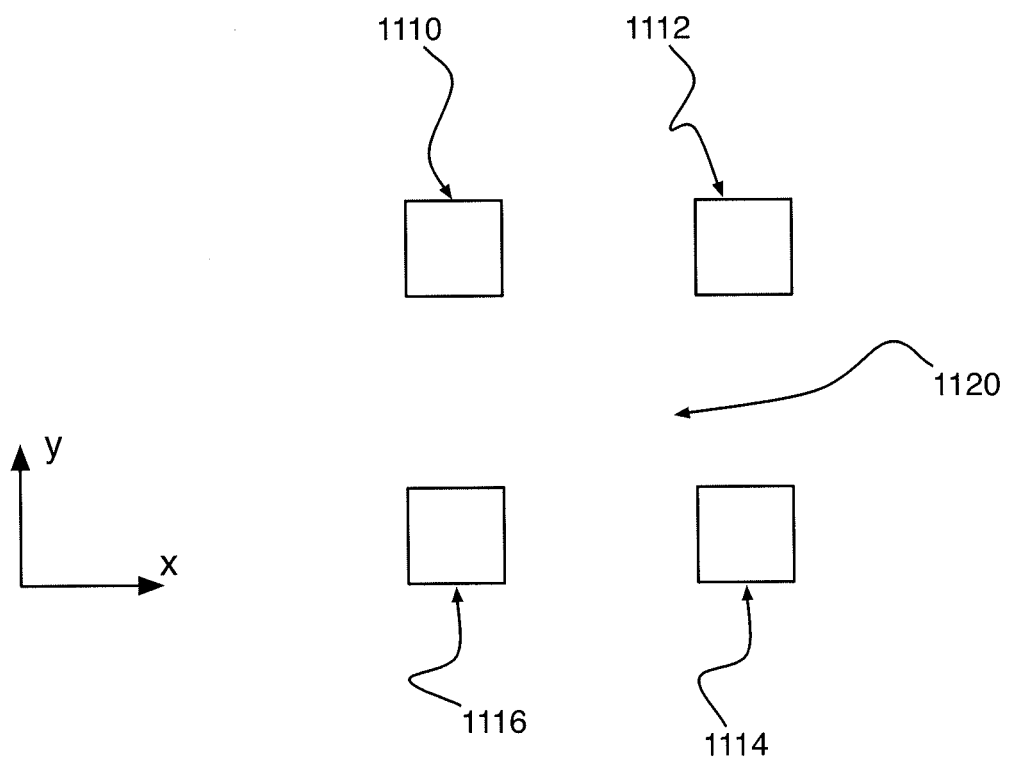
FIG. 11 is a schematic diagram of the cross section of a plurality of signal paths in accordance with at least one embodiment of the invention.
Figure 12:
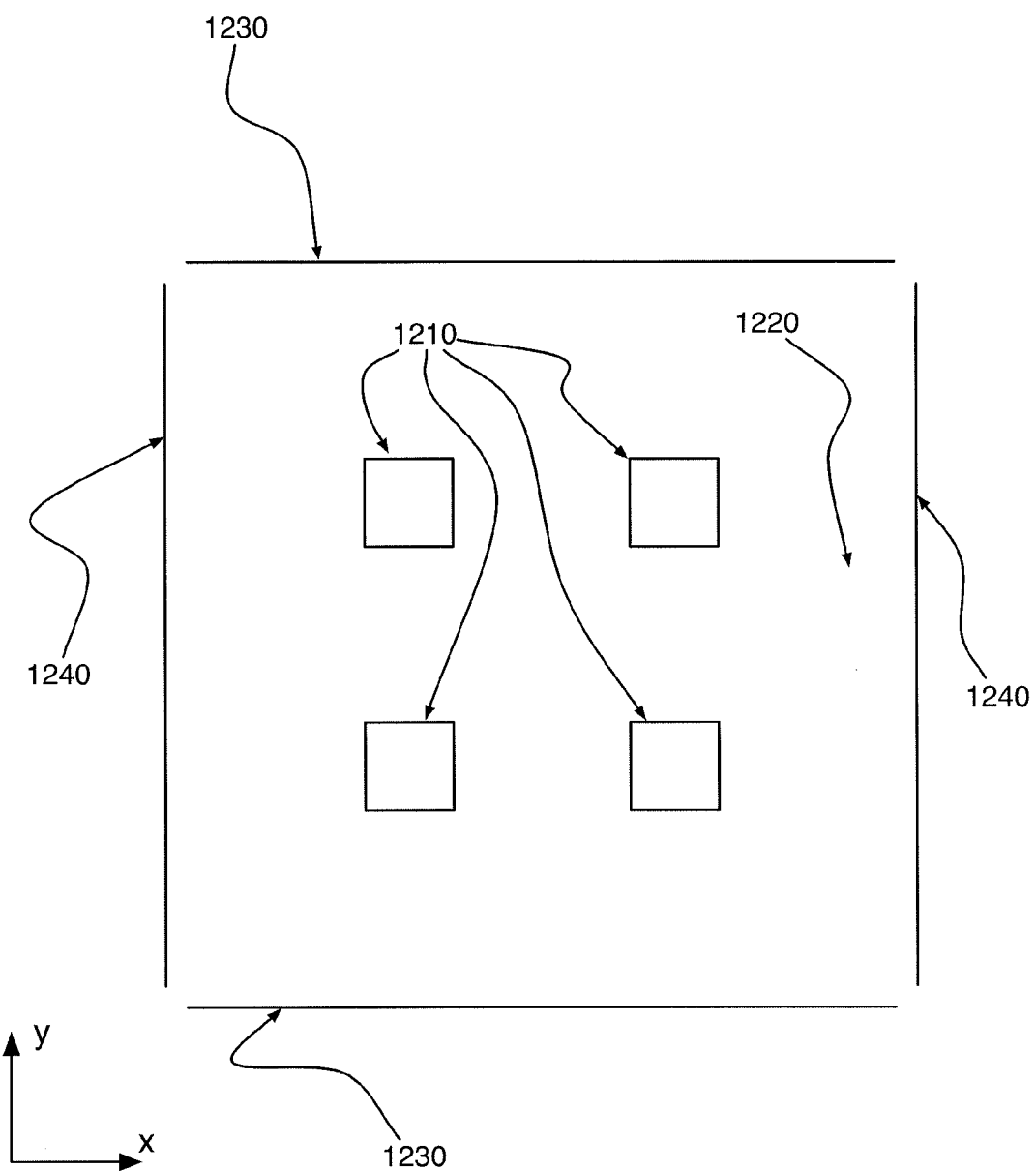
FIG. 12 is a schematic diagram of the cross section of a plurality of signal paths in accordance with at least one embodiment of the invention.

FIG. 11 exemplifies the cross section of four signal paths 1110, 1112, 1114, 1116 surrounded by a medium 1120. The cross section is aligned to the x and y axis of a Cartesian coordinate system for illustrational purpose. For this case the direction of propagation is the direction of the z-axis.

The signal paths exemplified in FIG. 11 may be for instance conductors in which case FIG. 11 exemplifies a cross section of a MCTL. It is assumed that the cross section is substantially similar along the direction of propagation. This may be understood with regard to MCTLs as a uniform cross section along the direction of propagation. For MCTLs, the medium 1120 may be a dielectric material.

The crosstalk matrix $H(t)$ defining the transfer of the signal paths 1110, 1112, 1116, 1114 is circulant due to the geometrical symmetry of the cross section. As will be clear to those of skill in the art, for the signal paths in FIG. 11 the crosstalk matrix $H(t)$ has the form given by Eqn. 13.

$$H(t) = \begin{bmatrix} h_0(t) & h_1(t) & h_2(t) & h_1(t) \\ h_1(t) & h_0(t) & h_1(t) & h_2(t) \\ h_2(t) & h_1(t) & h_0(t) & h_1(t) \\ h_1(t) & h_2(t) & h_1(t) & h_0(t) \end{bmatrix} \quad [\text{Eqn. 13}]$$

In Eqn. 13 the transfer from the input of signal paths 1110, 1112, 1114, 1116 to the output of signal paths 1110, 1112, 1114, 1116 is given by the first, second, third and fourth column of $H(t)$, respectively.

In accordance to at least one embodiment, the cross section of n signal paths has a discrete rotational symmetry of order n. A cross section has a discrete rotational symmetry of order n when it is physically indistinguishable when rotated by an integer multiple of 360/n degrees. In such case the crosstalk matrix $H(t)$ is a circulant matrix. The cross section exemplified in FIG. 11 has a discrete rotational symmetry of order 4.

The signal paths 1110 may be conductors in which FIG. 11 is an example of a MCTL. In such case it may be preferred to add additional conductors that may be grounded. FIG. 11 shows a cross section of a MCTL comprising four conductors 1210 which are surrounded by a dielectric material 1220. Furthermore, the MCTL comprises ground planes 1230 and 1240. The top and bottom ground planes 1230 may be implemented as a conventional metal layer in a PCB design. The ground planes 1240 on the side may be implemented by a set of vias that are distributed along the length of the MCTL structure.

An example of a cross section of a channel comprising n=8 signal paths that has a discrete rotational symmetry of order 8 is now further described with reference to FIG. 13. The cross section comprises signal paths 1310 that are surrounded by a material 1320. The medium itself may be surrounded by another material 1330.

Figure 13:
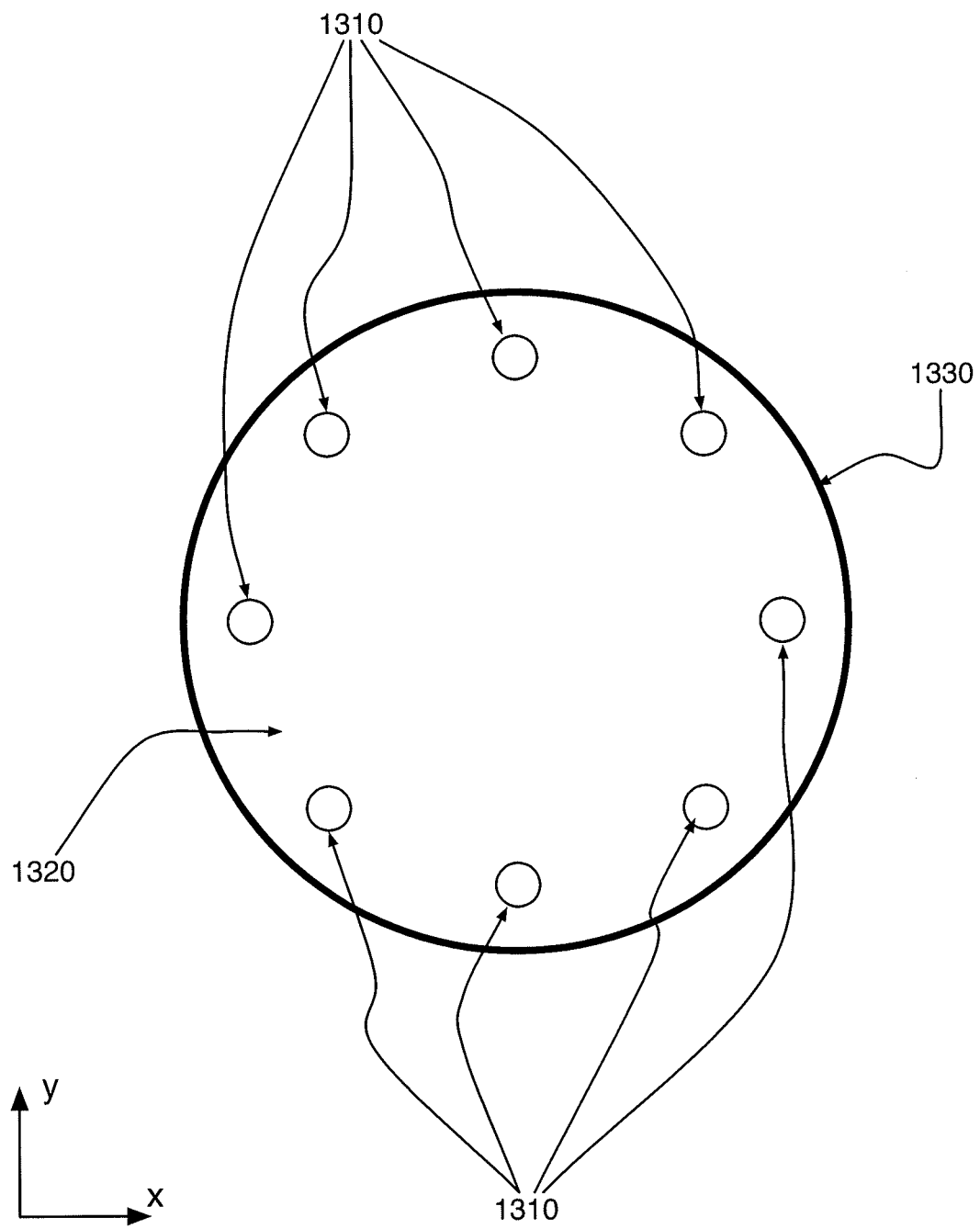
FIG. 13 is a schematic diagram of the cross section of a plurality of signal paths in accordance with at least one embodiment of the invention.

The cross section of FIG. 13 may be implemented as for instance a cable where the signal paths 1310 are conductors. In such case, the medium 1320 may be a dielectric material and material 1330 may be an additional conductor that can act as a ground shield.

The cross section of FIG. 13 may also be implemented as an optical fiber where the signal paths 1310 have a higher refractive index compared to the surrounding medium 1320. This allows light waves to be guided along the signal paths 1310.

Figure 14:
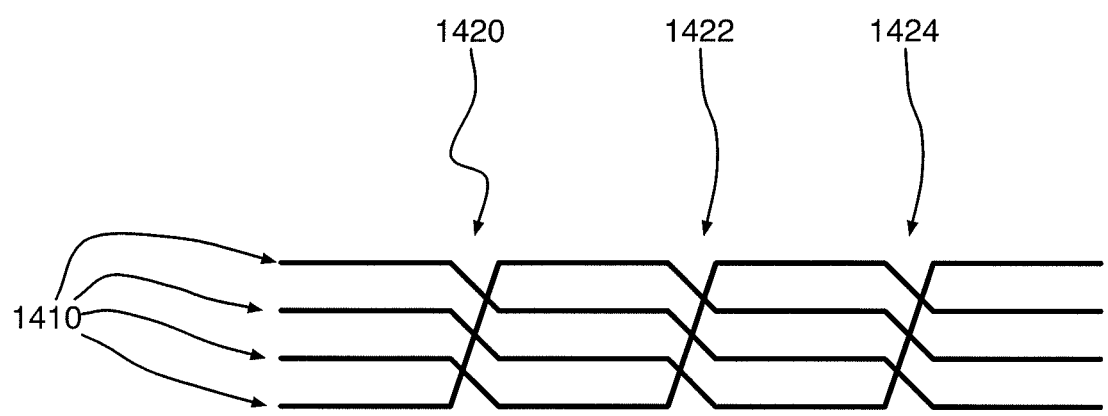
FIG. 14 is a schematic diagram of a plurality of signal paths in accordance with at least one embodiment of the invention.

In another embodiment, the symmetry between the signals $x_0(t), \ldots, x_{n-1}(t)$ propagating on the signals paths may be achieved by a twisting or permutation of the signal paths along the direction of propagation. FIG. 14 shows a schematic overview of configuration of four signal paths 1410 that are twisted. The signal order of the signal paths may be exchanged at several locations to perform the twisting. The signal paths of FIG. 14 are twisted at locations 1420, 1422, 1424.

A channel comprising a linear array of n signal paths may be rendered circulant by providing a set of n! sections of the signal paths where each section corresponds to a unique permutation of the signal paths.

In accordance to at least one embodiment of the invention, the channel 110 is defined by a physical structure that renders the crosstalk matrix H(t) circulant by a twisting or permutation along sections of n signal paths.

Additional Embodiments

Several processes that may be implemented by transmitters and receivers operating according to present teachings are now further described with reference to FIG. 15-17.

Figure 15:
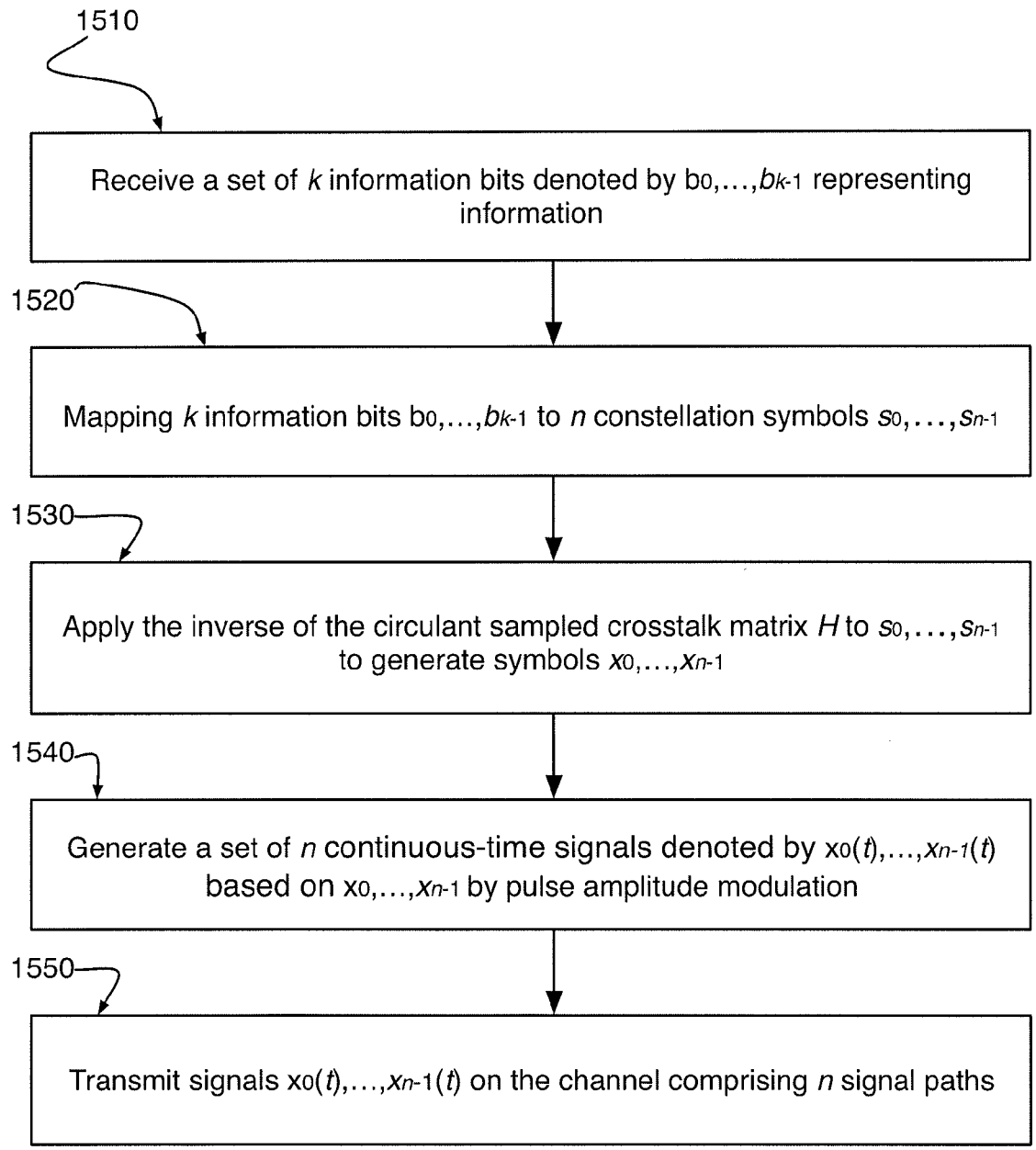
FIG. 15 exemplifies a process that may be implemented by a transmitter in accordance with at least one embodiment of the invention.

FIG. 15 exemplifies a process that may be implemented by a transmitter in accordance with at least one embodiment of the invention. In Step 1510, a set of k information bits is received. These information bits are denoted by $b_0, \ldots, b_{k-1}$. In Step 1520, the k information bits are mapped to a set of n constellation symbols $s_0, \ldots, s_{n-1}$. In Step 1530, the inverse of the circulant sampled crosstalk matrix H is applied to $s_0, \ldots, s_{n-1}$ to generate the symbols $x_0, \ldots, x_{n-1}$. In Step 1540 a set of n continuous-time signals are generated which are denoted by $x_0(t), \ldots, x_{n-1}(t)$. The signals $x_0(t), \ldots, x_{n-1}(t)$ may be generated by pulse amplitude modulation where the pulse amplitudes are given by the symbols $x_0, \ldots, x_{n-1}$. The signals $x_0(t), \ldots, x_{n-1}(t)$ may be transmitted on n signal paths in Step 1550.

Figure 16:
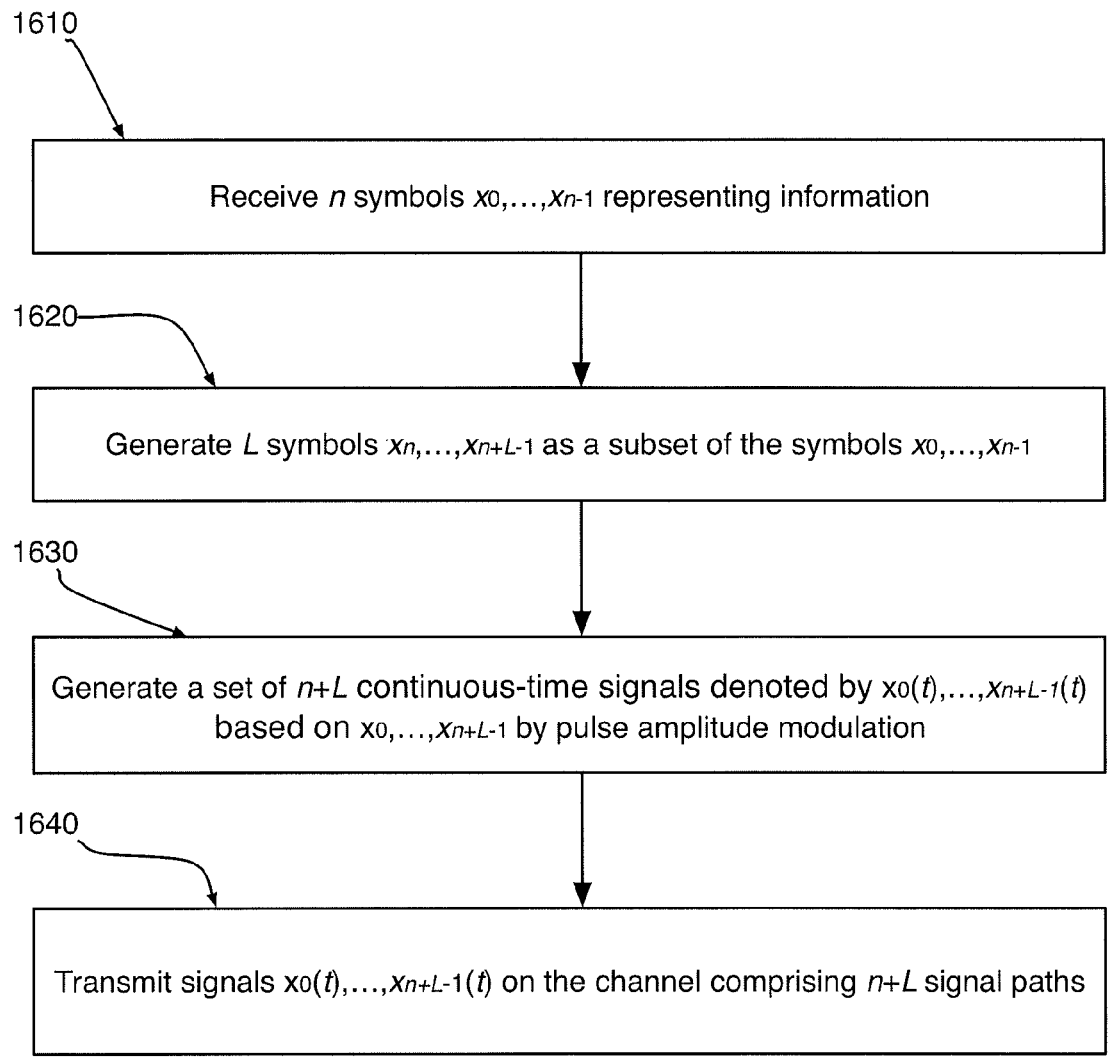
FIG. 16 exemplifies a process that may be implemented by a transmitter in accordance with at least one embodiment of the invention.

FIG. 16 exemplifies another process that may be implemented by a transmitter in accordance with at least one embodiment of the invention. In Step 1610, n symbols $x_0, \ldots, x_{n-1}$ representing information are received. In Step 1620, L symbols $x_n, \ldots, x_{n+L-1}$ are generated as a subset of symbols $x_0, \ldots, x_{n-1}$. This may be performed by setting $x_{i+n}=x_i$ for $i=0, \ldots, L-1$. In Step 1630, a set of n+L continuous-time signals are generated which are denoted by $x_0(t), \ldots, x_{n+L-1}(t)$. The signals $x_0(t), \ldots, x_{n+L-1}(t)$ may be generated by pulse amplitude modulation where the pulse amplitudes are given by the symbols $x_0, \ldots, x_{n+L-1}$. The signals $x_0(t), \ldots, x_{n+L-1}(t)$ may be transmitted on n+L signal paths in Step 1640.

Figure 17:
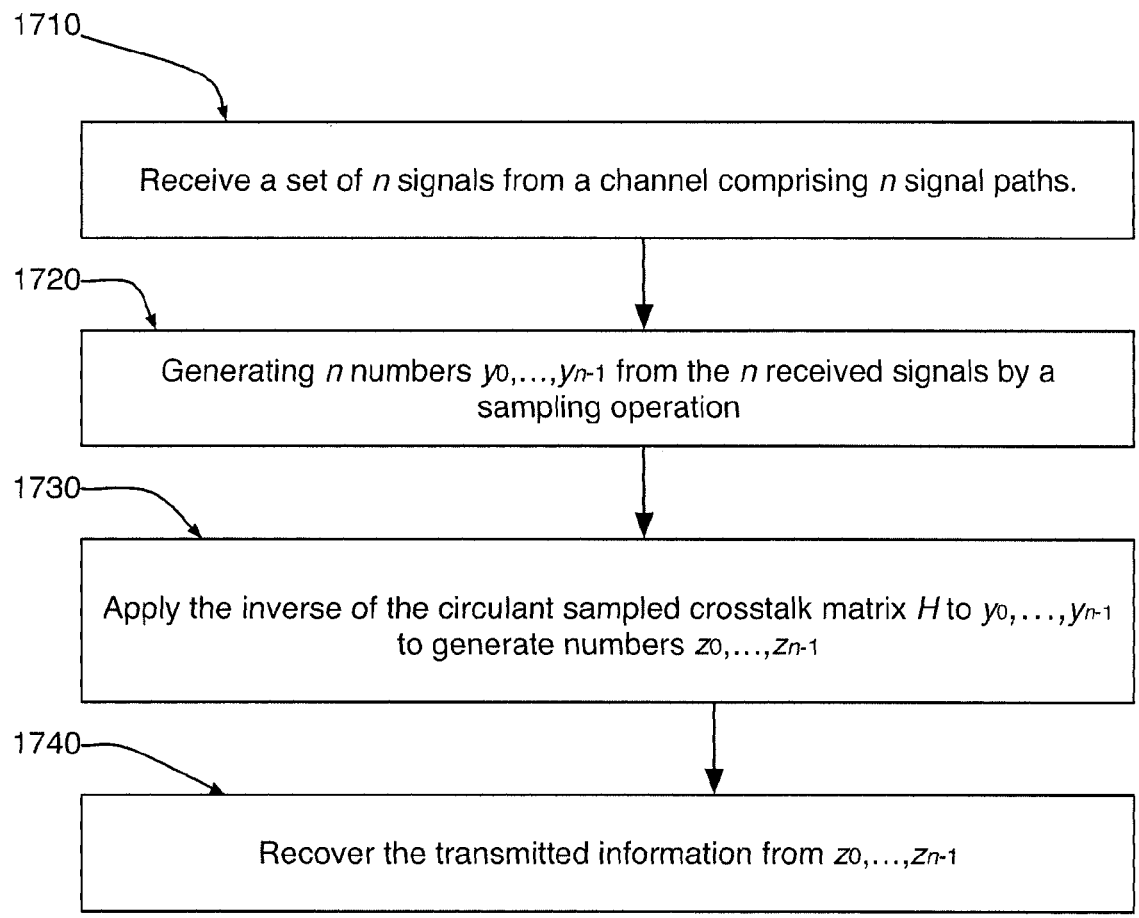
FIG. 17 exemplifies a process that may be implemented by a receiver in accordance with at least one embodiment of the invention.

FIG. 17 exemplifies a process that may be implemented by a receiver in accordance with at least one embodiment of the invention. In Step 1710, a set of n signals are received and/or sensed from a channel comprising n signal paths. In Step 1720, n numbers or samples are generated from the n signals received. This may be accomplished by sampling the signals present on the signal paths. These samples are denoted by $y_0, \ldots, y_{n-1}$. In Step 1730, the inverse of the circulant sampled crosstalk matrix H is applied to the samples $y_0, \ldots, y_{n-1}$ to generate the symbols $z_0, \ldots, z_{n-1}$. In Step 1740, the information transmitted is recovered from $z_0, \ldots, z_{n-1}$.

In accordance with at least one embodiment of the invention equalization is used in conjunction with present teachings to mitigate inter-symbol interference. Many forms of equalization are possible. For instance, the transmitter 230 of FIG. 3 may employ a pulse shape p(t) that mitigates inter-symbol interference. This may be achieved by applying a root-raised-cosine filter to the pulse shape p(t). A transmitter may also employ a finite impulse response (FIR) filter. Equalization may also be implemented at the receiver. A receiver may for instance implement a continuous-time linear equalizer (CTLE).

A communication system designed according to the teachings of this disclosure may also use more sophisticated equalization techniques such as discrete multi-tone (DMT) or orthogonal frequency division multiplexing (OFDM).

The present teachings may also be used in conjunction with techniques for advanced modulation and error-correction. The DMOD unit as depicted in e.g. FIG. 3 may implement more sophisticated modulation and encoding than PAM modulation. In general the DMOD may map k information bits to elements of an n dimensional signal constellation in e.g. n dimensional Euclidian space. This mapping may even include the encoding of k bits into a code word from an error-correcting code such as a low-density parity-check code or Reed-Solomon code. The coordinates of the resulting code word may consecutively be mapped to elements of a signal constellation. Many design choices exists as known to those of skill in the art.

The present teachings may be combined with other techniques used in communications and chip-to-chip communications. Examples are clock-and-data-recovery (CDR), synchronization, channel estimation, error-control encoding and decoding, framing, etc.

The present teachings may not only be useful for communication of information. The teachings may also be used for information storage. In this setting, the signal paths may comprise the physical storage cells. These storage cells are often placed in physical vicinity and may interfere with each other during reading and writing of information. A good example of this is a DRAM where information is stored on capacitors and these capacitors may interfere with each other and therefor leading to crosstalk.

Figure 18:
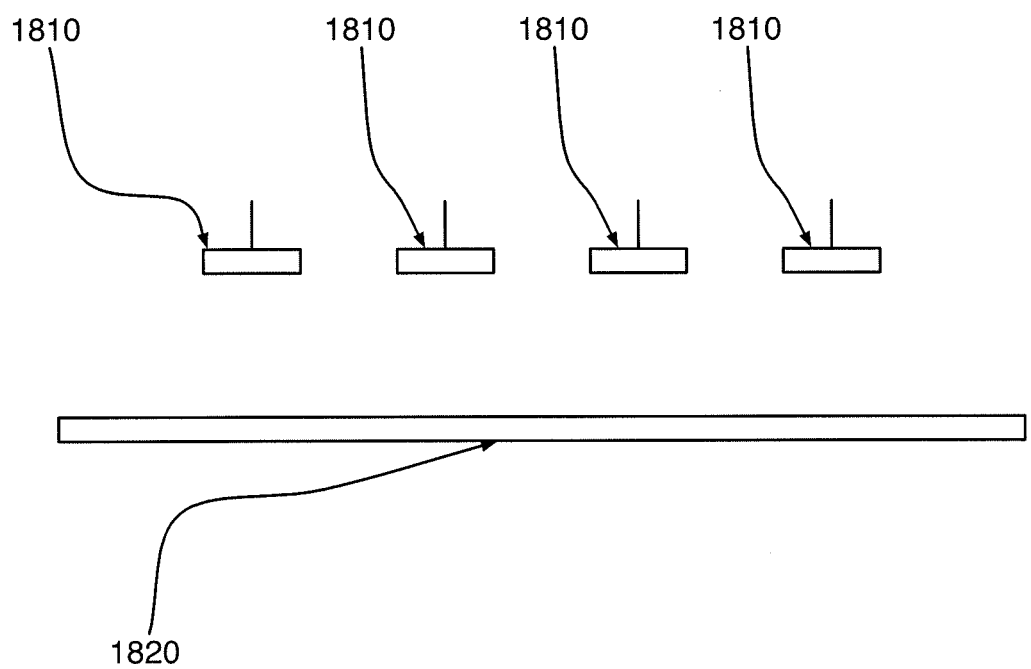
FIG. 18 is a schematic diagram of storage cells in accordance with at least one embodiment of the invention.
Figure 19:
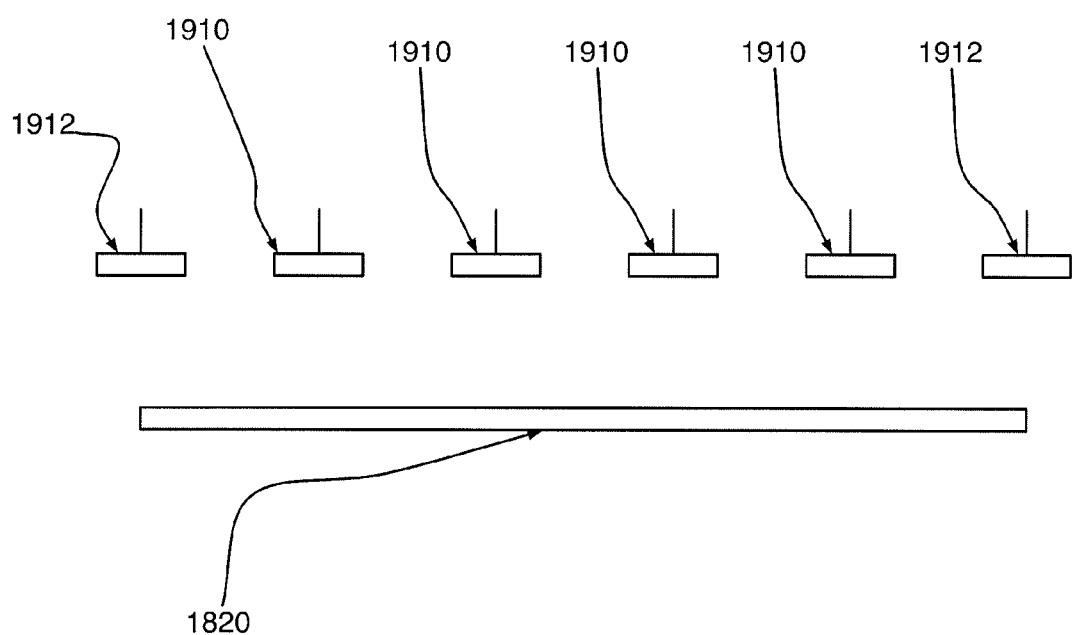
FIG. 19 is a schematic diagram of storage cells in accordance with at least one embodiment of the invention.

FIG. 18 exemplifies a cross section of a DRAM chip comprising a ground substrate 1820 and four capacitor plates 1810. The capacitor plates 1810 may have a cross capacitance between each other and this may cause crosstalk. According to the present teachings, dummy capacitor plates may be used as shown in FIG. 19. FIG. 19 exemplifies the capacitor plates 1910 with two dummy capacitor plates 1912.

The read-write circuitry used to store information to the DRAM cells may employ a TCC unit and a SE unit to render the equivalent capacitance matrix circulant. In this way crosstalk between the capacitor plates may be cancelled. The advantage is that the capacitor plates may be placed closer to one other and thereby increasing the density of the DRAM.

Figure 20:
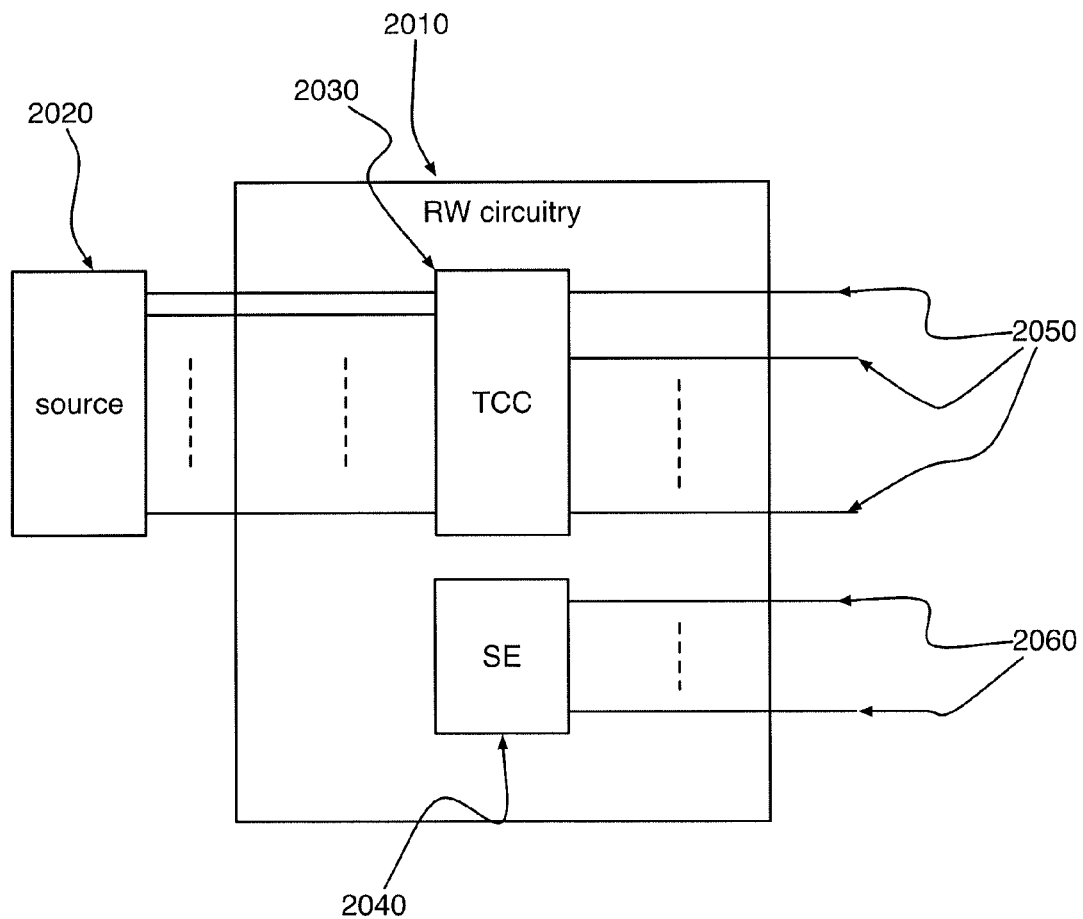
FIG. 20 is a schematic diagram of read-and-write circuitry for a plurality of storage cells in accordance with at least one embodiment of the invention.

FIG. 20 exemplifies read-and-write (RW) circuitry 2010 for a DRAM. FIG. 20 exemplifies RW circuitry 2010 that comprises a TCC unit 2030 and a SE unit 2040. The information to be stored is available in the source 2020. The TCC unit 2030 may apply the inverse of a circulant matrix and store information on signal paths and storage cells 2050. The SE unit 2040 may generate symbols and/or signals to be stored on signal paths and storage cells 2060 such that the crosstalk between the symbols stored on signal paths 2050 may be described by a circulant matrix. The RW circuitry may comprise other functionality as required for a proper functioning of the DRAM.

The present teachings may be used to create very high-density multi-conductor transmission lines. The wires of on-chip links and PCB backplanes may be placed very close to another. Therefore the amount of information that may be transmitted per square micrometers of cross section may be increased substantially since crosstalk may efficiently be cancelled. The present teachings may also be used for silicon interposers and TSVs.

Another application is very high-density cables. A cross section of a cable as exemplified in e.g. FIG. 13 may be suitable to create cables for which crosstalk is easily cancelled and that allow for transmission of a very large amount of data.

Some embodiments are described herein, including the best mode known to the inventors. Further embodiments can be envisioned by one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using analog or digital hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

All references, including publications, patent applications, and patents, cited herein are hereby incorporated by reference to the same extent as if each reference were individually and specifically indicated to be incorporated by reference and were set forth in its entirety herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method of transmitting symbols representing information over a channel comprising at least four signal paths with at least four pulse amplitude modulation signals where the crosstalk between the symbols due to transmission on the channel is described by a crosstalk matrix, the method comprising:
    receiving a first set of symbols representing the information;
    forming a first set of signals comprising at least four signals, by pulse amplitude modulation of a pulse shape where the pulse amplitudes are based at least in part on the first set of symbols;
    forming a second set of signals consisting of a subset of the first set of signals;
    dividing the signal paths into a first group of signal paths and a second group of signal paths;
    providing the first set of signals for transmission over the first group of signal paths; and
    providing the second set of signals for transmission over the second group of signal paths causing the crosstalk matrix to be circulant, wherein crosstalk between the symbols is cancelled by a transmitter or receiver with less than quadratic complexity with respect to the number of signal paths.

2. The method of claim 1 where the pulse shape is a non-return-to-zero pulse shape or return-to-zero pulse shape.

3. The method of transmitting information in accordance with claim 1, where the first set of symbols is formed by application of the inverse of the circulant sampled crosstalk matrix to a second set of symbols representing the information.

4. The method of claim 3 where the application of the inverse of the circulant sampled crosstalk matrix comprises a fast Fourier transform.

5. The method of claim 1 where the signals paths comprise at least one of electrical conductors, electrical waveguides, or optical waveguides.

6. A method of transmitting symbols representing information over a channel comprising n signal paths with at least n pulse amplitude modulation signals where the crosstalk between the symbols due to transmission on the channel is described by a crosstalk matrix, the method comprising:
    providing n signal paths in a configuration where the cross section of the signal paths has a discrete rotational symmetry of order n, wherein n is an integer larger than three;
    receiving a first set of symbols representing the information;
    forming a first set of signals by pulse amplitude modulation of a pulse shape where the pulse amplitudes are based at least in part on the first set of symbols; and
    providing the first set of signals for transmission over the signal paths such causing the crosstalk matrix to be circulant, wherein a second set of symbols representing information is formed based on the first set of symbols, wherein crosstalk between the symbols is cancelled by a transmitter or receiver with less than quadratic complexity with respect to the number of signal paths.

7. The method of claim 6, where the first set of symbols is formed by application of the inverse of the circulant sampled crosstalk matrix to a second set of symbols representing information.

8. The method of claim 6 where the pulse shape is a non-return-to-zero pulse shape or return-to-zero pulse shape.

9. The method of claim 7 where the inverse of the circulant sampled crosstalk matrix comprises a fast Fourier transform.

10. The method of claim 6 where the signal paths are one of electrical conductors, electrical waveguides, or optical waveguides.

11. The method of claim 1 where the first set of symbols representing the information comprises symbols that are taken from an M-PAM signal constellation where M is an integer equal to one of 2, 3, 4, 8, 16.

12. The method of claim 1 where the signal paths are configured in a linear array.

* * * * *